United States Patent
Corbett et al.

(10) Patent No.: US 10,776,888 B1
(45) Date of Patent: *Sep. 15, 2020

(54) SYSTEMS AND COMPUTER-IMPLEMENTED METHODS TO COMPARE AND IDENTIFY DUPLICATIVE PRESENTATIONS OF COMPARABLE DATA FILES INCLUDING IMAGERY AND DATA REPRESENTATIONS OF RENTAL PROPERTY LISTINGS

(71) Applicant: HomeAway.com, Inc., Austin, TX (US)

(72) Inventors: Ronald William Corbett, Austin, TX (US); Bryon Kristen Jacob, Austin, TX (US); David Petty, Austin, TX (US)

(73) Assignee: HomeAway.com, Inc., Austin, TX (US)

( * ) Notice: Subject to any disclaimer, the term of this patent is extended or adjusted under 35 U.S.C. 154(b) by 348 days.

This patent is subject to a terminal disclaimer.

(21) Appl. No.: 15/853,168

(22) Filed: Dec. 22, 2017

Related U.S. Application Data

(63) Continuation of application No. 14/644,722, filed on Mar. 11, 2015, now Pat. No. 9,858,628.

(51) Int. Cl.
| | |
|---|---|
| G06F 16/215 | (2019.01) |
| G06F 16/583 | (2019.01) |
| G06F 16/2455 | (2019.01) |
| G06Q 50/16 | (2012.01) |
| G06Q 30/06 | (2012.01) |

(52) U.S. Cl.
CPC ......... G06Q 50/163 (2013.01); G06F 16/215 (2019.01); G06F 16/24556 (2019.01); G06F 16/583 (2019.01); G06Q 30/0645 (2013.01)

(58) Field of Classification Search
CPC . G06F 16/583; G06F 16/24556; G06F 16/215
See application file for complete search history.

(56) References Cited

U.S. PATENT DOCUMENTS

| | | | |
|---|---|---|---|
| 9,569,700 | B1 | 2/2017 | Santos et al. |
| 9,858,628 | B2 | 1/2018 | Corbett et al. |
| 2003/0229504 | A1 | 12/2003 | Hollister |
| 2006/0218003 | A1 | 9/2006 | Snyder |
| 2012/0209837 | A1 | 8/2012 | Hintze et al. |

(Continued)

*Primary Examiner* — Kris E Mackes
(74) *Attorney, Agent, or Firm* — Knobbe, Martens, Olson & Bear, LLP

(57) ABSTRACT

A datastore that includes property listings (e.g., for rental properties) may be accessed by a computing resource configured to execute a thumb printing algorithm to generate summary data values (e.g., thumbprint values, hash values) of digital data included one or more images of a property listing. The summary data values along with listing attributes (e.g., address, zip code, geolocation, brand, number of bedrooms/bathrooms/sleeps, amenities) of the property listing may be compared with summary data values and listing attributes of other property listings to determine if the summary data values of one or more images match and if one or more listing attributes match. A threshold number of image matches and listing attribute matches may indicate that the property listings are duplicate property listings, which may be merged, removed or replaced with links/pointers by the computer resource to increase data storage space and/or reduce data search latency times of the datastore.

20 Claims, 11 Drawing Sheets

(56) References Cited

U.S. PATENT DOCUMENTS

| | | |
|---|---|---|
| 2012/0311431 A1 | 12/2012 | Breaker et al. |
| 2013/0018704 A1 | 1/2013 | Liu |
| 2014/0257924 A1 | 9/2014 | Xie et al. |
| 2016/0042478 A1 | 2/2016 | Howe |
| 2016/0267610 A1 | 9/2016 | Corbett et al. |

US 10,776,888 B1

SYSTEMS AND COMPUTER-IMPLEMENTED METHODS TO COMPARE AND IDENTIFY DUPLICATIVE PRESENTATIONS OF COMPARABLE DATA FILES INCLUDING IMAGERY AND DATA REPRESENTATIONS OF RENTAL PROPERTY LISTINGS

FIELD

The present application relates generally to systems, methods, software and computing devices for property listings. More specifically, to systems, method, software and computing devices for identifying and managing duplicate property listings.

BACKGROUND

Properties, such as vacation rental property, rental homes, rental condos and the like, may often have duplicate property listings that are listed on different property listing resources, such as different databases, different web sites, different rental agencies, or different property management systems, for example. In some examples, a property owner and/or an agent acting on behalf of an owner may list the same property on different property listing resources, resulting in multiple property listings that are associated with the same property. In some examples, the different property listing resources may be geographically diverse (e.g., in different countries). In other examples, the different property listing resources may be operated by a common corporate entity under different brand names. In yet other examples, the different property listing resources may be operated by different corporate entities. However, there may be duplicate property listings that exist among different property listing resources within the same corporate entity and/or among different property listing resources of different corporate entities. The duplication may be due to owners and/or agents posting their property listings among a variety of property listing resources, some within the same company but spread across different brands operated by the company and/or spread across one or more brands of different companies.

In some examples, one company having X property listings may acquire or may be acquired by another company having Y property listings. Due to a real possibility of duplication in property listings between the two companies, it may be unknown or not readily discernible how many of their respective property listings are duplicates and how many are actually property listings that are unique to each company. Accordingly, an accurate monetary valuation of the unique property listings of the company to be acquired may be difficult unless duplicate property listings are factored out of the valuation.

Duplicate property listings may require more data storage space and may make searches for property listings more compute intensive, time consuming, and less accurate due to duplication of property listings that may be output as search results. In some examples, an owner or agent who has listed a property may be removed by a property listing service or website due to failure to pay fees (e.g., listing fees) or due to posting fraudulent property listings. An example of a fraudulent listing may include a scenario where photos and/or other information for another property listing are used to represent the property listing that was posted. For example, if the fraudulent owner/agent has a dive property to list, they may use photos and/or other information taken from a nicer listing to represent the dive listing. It may be difficult to detect the use of misrepresented information associated with a property listing. Further, if the fraud is detected and the offending entity is barred from posting new listings, that entity may nevertheless use a new user name, new password, new email address or other form of access credentials to establish a new account from which fraudulent listing may again be posted using fake information, such as photos and the like.

Thus, there is a need for systems, methods and software to detect and identify duplicate property listings.

BRIEF DESCRIPTION OF THE DRAWINGS

Various embodiments or examples ("examples") of the present application are disclosed in the following detailed description and the accompanying drawings. The drawings are not necessarily to scale.

DETAILED DESCRIPTION

Various embodiments or examples may be implemented in numerous ways, including as a system, a process, a method, an apparatus, a user interface, or a series of program instructions on a non-transitory computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1A:
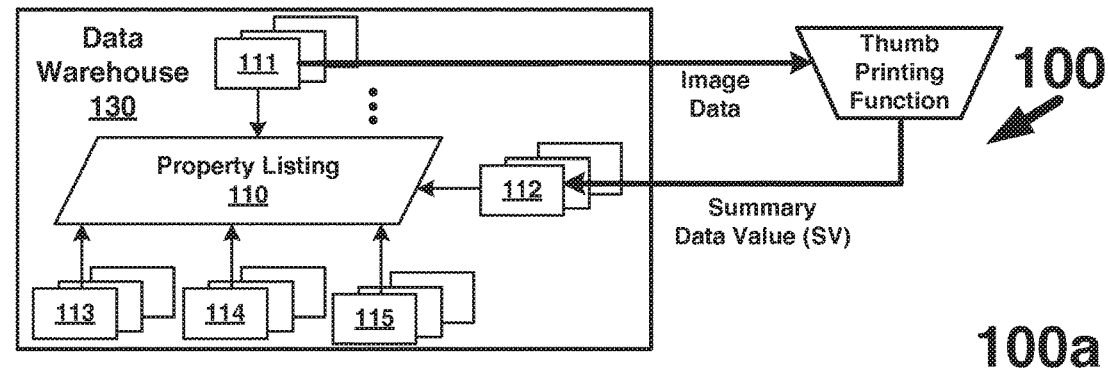
FIG. 1A depicts examples of data representing property listings.
Figure 1A:
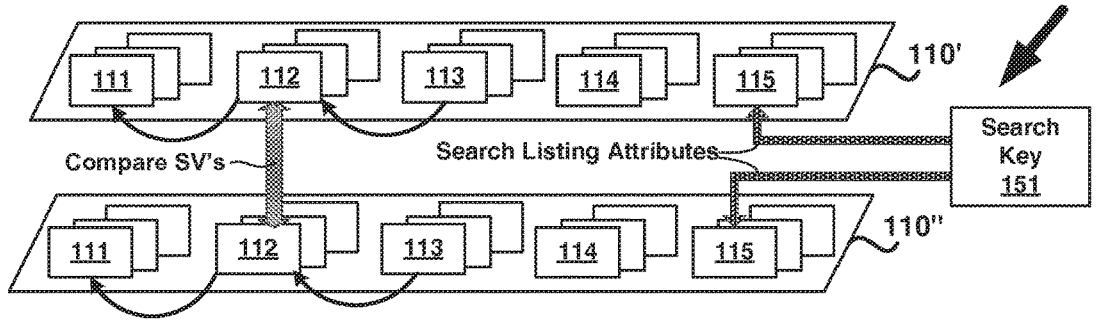
Figure 1A:
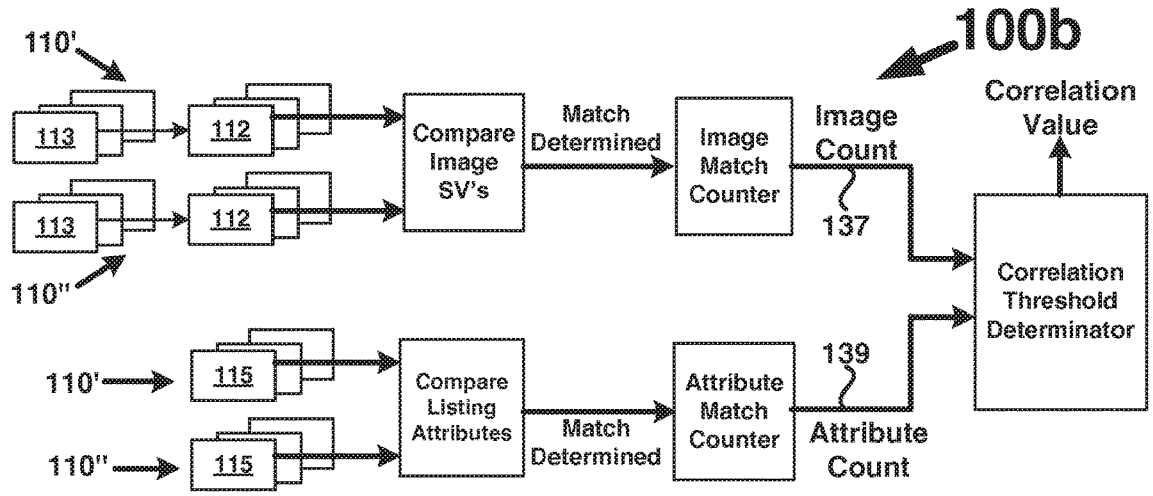
Figure 1A:
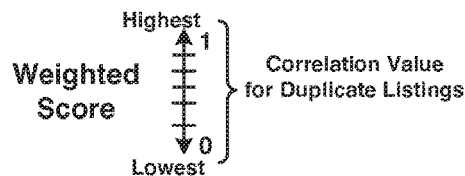

FIG. 1A depicts examples of data representing property listings. In FIG. 1A a data warehouse 130 may include data representing property listings 110 that are stored in data warehouse 130. Although one such property listing is depicted in example 100, the data warehouse 130 may include several property listings 110, such as several hundred thousand to several million or more, for example. The data representing each property listing may include data for one or more images 111 (e.g., photos of vacation rental units, real property, etc.), an image identifier 113 associated with each image 111, a listing identifier 114 associated with each image 111 and listing attributes associated with each property listing (e.g., zip code, address, number of bed rooms, number of bath rooms, number of sleeps, a geolocation, etc.). For each property listing 110, the data representing each image 111 may be received by a thumb printing function (e.g., a thumb printing algorithm) configured to generate a summary data value 112 for each image. For example, summary data value 112 may constitute a summary data value 112 of digital data in image 111. The thumb printing function generates summary data values 112 (SV's) for each image 111 that is configured to uniquely distinguish images 111 associated with property (e.g., rental property, property listings, vacation rental listings, real property) from other images 111 associated with property. Summary data values 112 may also be referred to herein as thumbprint values 112. The thumbprint value 112 may be associated with its respective image 111 via the image identifier 113 for the image 111. The thumb printing function may generate thumbprint values 112 for each image 111 in every property listing 110 in data warehouse 130. Each thumbprint value 112 may uniquely identify each image 111 the thumbprint value 112 is associated with and the thumbprint value 112 may be used to compare an image 111 in a property listing 110 with another image 111 in another property listing 110 to determine if the images 111 are duplicate images 111 based on a comparison between their thumbprint values 112 that indicates the thumbprint values 112 match each other. A match need not be an exact match and images 111 that may be substantially similar to each other may have thumbprint values 112 that match each other.

Potentially duplicate property listings 110 in data warehouse 130 may be identified by first determining if one or more thumbprint values 112 in one property listing 110 matches one or more thumbprint values 112 in a different property listing 110. Matching thumbprint values 112 may be just one indication of potentially duplicate property listings 110 and other data included in the data representing each property listing 110 may be used in addition to thumbprint values 112 to increase confidence in determining whether or not data warehouse 130 includes duplicate property listings 110.

In example 100a a search key 151 (e.g., using zip code as the search parameter) may be used to search for property listings 110 in data warehouse 130 that may include data that matches the search key 151. For example, listing attributes 115 in each listing 110 may include data representing zip codes and a zip code as the search key 151 may match listing attributes 115 in a listing 110' and in another listing 110", for example. The two listings having listing attributes 115 that matched the search key 151 may be further inspected to determine if they are potentially duplicate listings 110 by comparing thumbprint values 112. Accordingly, each thumbprint value 112 in listing 110' may be compared with each thumbprint value 112 in listing 110" to determine if one or more of the thumbprint values 112 being compared match each other.

In example 100b, each image identifier 113 associated with each image 111 in listing 110' may be used to select the thumbprint value 112 associated with each image 111 in listing 110' and the selected summary data value 112 may be received by comparator configured to compare summary data values (SV's). Similarly, each image identifier 113 associated with each image 111 in listing 110" may be used to select the selected summary data value 112 associated with each image 111 in listing 110" and the selected summary data value 112 may be received by the comparator. The comparator may compare each pair of summary data values 112 (SV's) it receives and determine if the received summary data values 112 match each other. If a match is determined the comparator may output data representing a match. An image match counter may receive the data representing the match and may increment an image count 137 for each match detected by the comparator. For example, if listing 110' includes image data for 10 images 111 and listing 110" includes image data for 15 images 111, if comparison of the summary data values 112 for those images indicates that between listings 110' and 110" there are potentially 7 images 111 that had summary data values 112 that matched, then the image count 137 may be incremented seven times and have a value of 7. If none of the summary data values 112 of the images 111 being compared match, then the image count 137 may be zero (0), for example.

Further to example 100b, secondary data may be used to determine a correlation value that two listings (110' and 100") are potentially duplicate listings 110. In example 100b, the listing attributes 115 of listing 110' may be compared with the listing attributes 115 of listing 110" by another comparator configured to detect matches between data representing attribute listings 115 (e.g., scalar data, numeric data, alpha-numeric data). Each listing attribute 115 in listing 110' that matches a listing attribute 115 in listing 110" may generate data representing a match and an attribute match counter may be incremented with each detected match and may generate and attribute count 139. If none of the listing attributes 115 being compared match, then the attribute count 139 may be zero (0).

As one example, the listing attributes 139 for a zip code have already been determined to match based on the selection key 151; therefore, attribute count 139 may be incremented to a value of 1. Further to the example, listing 110' may include listing attributes 115 for; number of bed rooms=4; number of bathrooms=2; and number of sleeps=5. listing 110" may include listing attributes 115 for; number of bedrooms=4; number of bathrooms=3; and number of sleeps=5. The listing attributes 115 for the number of bed rooms and number of sleeps match, but the number of bath rooms do not match. Accordingly, the attribute count 139 may be incremented by 2 to a value of 3 to indicate that two other listing attributes 115 matched between listings 110' and 110" (e.g., zip code, number of bed rooms and number of sleeps matched).

In example 100b, the image count 137 and the attribute count 139 may optionally be inputs to a confidence threshold determinator configured to determine if the image count 137 meets or exceeds an image threshold count and if the attribute count 139 meets or exceeds an attribute threshold count. For example, the image threshold count may be set to a value of 2 such that at least two images 111 (e.g., based on comparing their respective summary data values 112) in listing 110' and 110" matched each other. Further to the example, the attribute threshold count may be set to a value of 3 such that at least three listing attributes 115 in listing 110' and 110" must match. Accordingly, if image count 137 is ≥2 and the attribute count 139 is ≥3, then confidence threshold determinator may output a signal or data (e.g., a Correlation Value) that indicates that the two listings (110', 110") may be potentially duplicate listings. For example, the Correlation Value may be 0 or 1, with 0 being low or no correlation indicating that the two listings (110', 110") being duplicate listings, or with 1 being a high correlation that the two listings (110', 110") are duplicate listings. A corrective action may be taken in response to the signal or data, such as computer resource 120 accessing data warehouse 130 to modify, delete, consolidate, or replace data in one or more duplicate property listings 110. For example, if two duplicate listings 110 have the same zip code in their respective listing attributes 115, then a corrective action may include replacing the data representing the zip code in one of the duplicate listings 110 and replacing that data with a pointer, link, hyperlink or the like, to the identical item of data in the other duplicate listing 110. As another example, data in duplicate listings 110 may be combined into a single listing 110 and the data in the single listing 110 may constitute a superset of the data from the duplicate listings. Other corrective actions may be taken and the present application is not limited to the examples described or depicted herein.

In example 100c a score may be computed for each potentially duplicate listing 110 in data warehouse 130. Higher scores may be indicative of a higher correlation value that two listings 110 that were compared to each other are duplicate listings 110. Therefore, a correlation value of 1 may indicate a high confidence that two listing 110 are duplicated; whereas, a correlation value of 0 may indicate no confidence in two listing 110 being duplicated listings.

In example 100c, the score computed for each listing 110 may be a weighted score. For example, the score may constitute the sum of an image count 137 for a listing multiplied by an image weighting factor and the attribute count 139 for a listing multiplied by an attribute weighting factor. The score may be used in place of or in conjunction with the Correlation Value output of the correlation threshold determinator of example 100b.

Computer resource 120 and/or computer server resources 140 may reduce data storage space in the data warehouse 130 that is allocated to duplicate listings 110. Duplicate listings 110 may be consolidated into a single listing 110, may be deleted or otherwise removed from the data warehouse 130, or may be included in a data representing a report, for example. Data storage space in data warehouse 130 may be increased (e.g., freed up) by identifying and removing or consolidating duplicate listings 110. Searches of listings 110 in data warehouse 130 may be optimized (e.g., reduced data search latency times) by identifying and removing duplicate listings 110 or consolidating duplicate listings 110. For example, data included in duplicate listings may be different. One listing may have 10 images and another listing may have 15 images. Similarly, listing attributes may differ among duplicate listings (e.g., one listing includes the number of sleeps and the other listing does not). Consolidation may constitute creating (e.g., using a computer resource) a new property listing 110 that includes all of the data in the duplicate listings 110 and deleting or otherwise removing the duplicate listings 110. On the other hand, consolidation may constitute determining which data is common to the duplicate listings, which data is unique to each of the duplicate listings, and combining the common and unique data into one of the duplicate listings 110 and deleting or otherwise removing the other duplicate listing 110.

In FIG. 1A, a hashing function (e.g., a hash algorithm) may be one example of a thumb printing function that generates summary data values 112. For example summary data values 112 may be hash values generated by a hashing function. In some examples, a perceptual hashing function (e.g., p− hash) may be one example of a thumb printing function. Hashing functions and hash values are non-limiting examples of types of thumb printing functions and thumbprint values and the present application is not limited to using hashing functions and/or hash values as summarization values of image data.

Figure 1B:
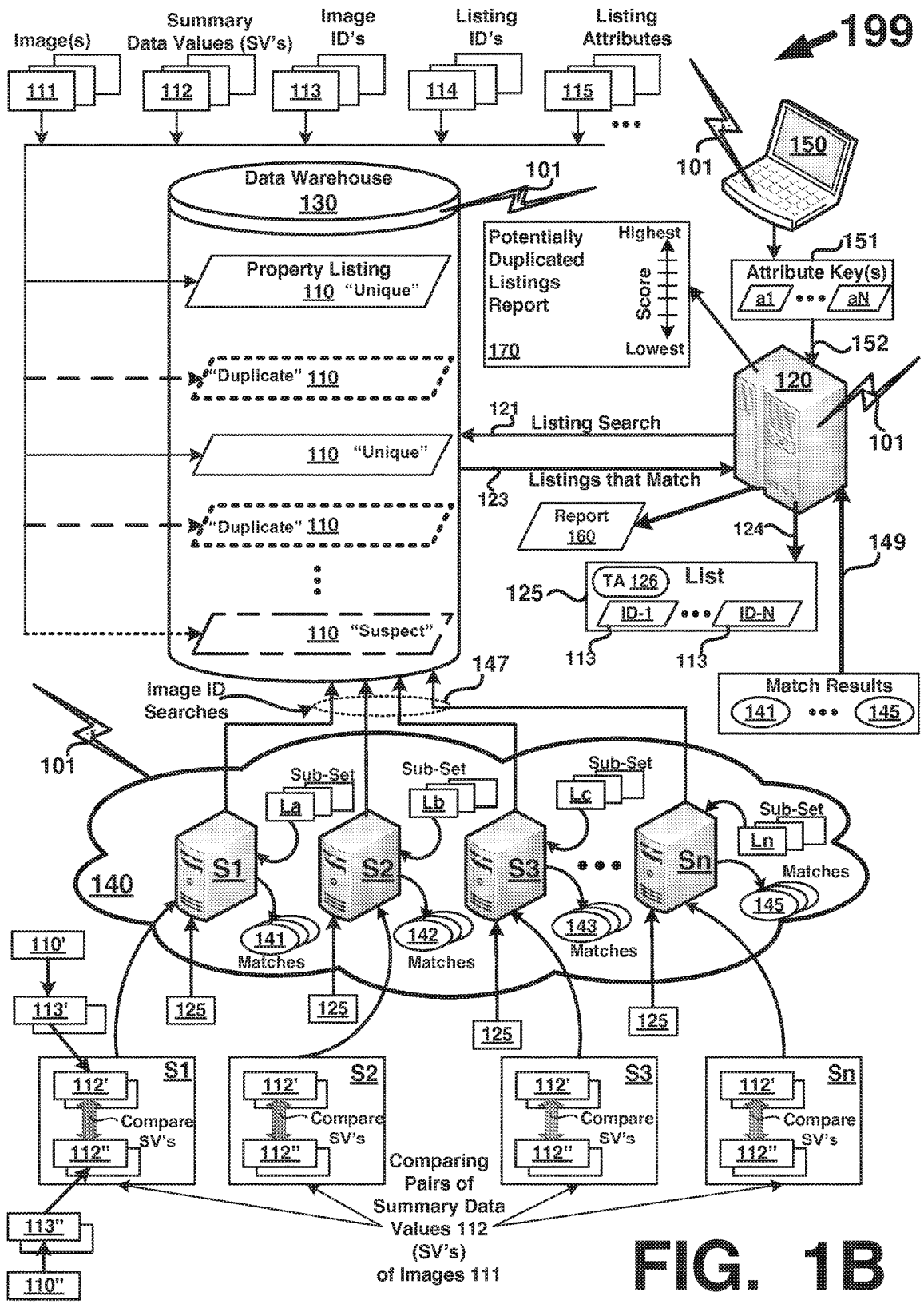
FIG. 1B depicts an example of a system for identifying duplicate property listings.

FIG. 1B depicts an example of a system for identifying duplicate property listings. In FIG. 1B, system 199 may include data warehouse 130 that includes stored data representing property listings 110. Each property listing 110 may include several items of data associated with a property listing (e.g., a vacation rental unit, a rental unit, rental property, real property, etc.). Non-limiting examples of data that may be included in the data representing property listings 110 include but are not limited to data representing one or more images 111 (e.g., digital data from a captured image), a summary data value 112 of image 111 (e.g., generated by a thumb printing function applied to each image 111 to generate the summary data value 112), an image ID 113 for each image 111, a listing ID 114 that associates each image 111 with the property listing 110 the image 111 belongs to, and listing attributes 115 associated with the property listing 110. The image ID 113 and/or listing ID 114 may constitute unique numeric or alpha-numeric data assigned (e.g., by a computing resource) to the ID's (113, 114), for example. Listing attributes 115 may differ among the property listing 110 stored in data warehouse 130. The image ID 113 and listing ID 114 may be unique to each property listing 110 and may be used as a search key to access data representing the property listing 110 and its associated data 111-115. Property listing 110 and its associated data 111-115 may be represented by a variety of data structures including but not limited to a data base, one or more files, linked lists, pointers to data, a look-up table, a thumbprint table, a hash table, or other data structures.

Images 111 may include metadata associated with the image 111 at the time image was captured and/or included in the image 111 after the image 111 was captured. The metadata may include data representing temporal information (e.g., date and/or time the image was captured), geolocation data (e.g., a longitude and latitude where the image was captured), scalar data such as notes, comments, captions or other information that may be included in metadata (e.g., by the device that captured the image 111 and/or software that edited/processed the image 111).

Listing attributes 115 may constitute data (e.g., in numeric form, alpha-numeric form, scalar data, and/or other forms of data) that may be associated with a property listing 110, including but not limited to an address, a zip code, a postal code, a state, a country, a town, a geographic descriptor, number of bed rooms, number of bath rooms, number of people the property listing will sleep (number of sleeps), amenities for the property listing (e.g., pool, Jacuzzi, sauna, scenic views, fireplace, etc.), kitchen information, parking information, a brand (e.g., a vacation rental company), property listing rules (e.g., non-smoking, no pets), a property description (e.g., Condo, townhouse, detached home, duplex, number of stories, etc.), and metadata, for example.

Data warehouse 130 may constitute a data storage resource (e.g., RAID, NAS, hard disc drive(s), solid state drive(s), a memory, RAM, Flash memory, etc.) that may be in data communication 101 (e.g., networked via wired and/or wireless communications links) with other devices, such as a computer resource 120, computing device 150, one or more computer server resources S1-Sn, denoted generally as computer server resources 140. Computer server resources 140 may include one or more compute engines, computer servers, virtual machines, or some combination of the foregoing. Data communication 101 may constitute wired and/or wireless communications via one or more communication mediums. Computer server resources 140 may be networked with each other and may be networked with one or more external resources (e.g., 120, 130, 150). Processing of data may be accomplished by computer resource 120, by computer server resources 140 or by computer resource 120 and computer server resources 140. When several computing resources are used (e.g., to parallelize processing tasks), each computing resources may be assigned to operate on a portion of a larger processing task.

The data representing the property listings 110 may derive from several sources, such as owners of property listings, agents acting on behalf of one or more owners of property listings, a vacation rental business, just to name a few. Sources that input at least a portion of the data representing the property listings 110 (e.g., using a menu and/or a GUI on a web site, smartphone/pad application, a laptop, or PC) may make "unique" entries for property listings 110 that are not duplicated within data warehouse 130, may make "duplicate" entries of the same physical property listing 110 for which there may be two or more instances of the "duplicate" entries stored in data warehouse 130, and may make entries that may constitute a "suspect" property listing 110 stored in data warehouse 130. "Suspect" property listings 110 will be described in greater detail below.

Duplicate entries of property listings 110 in data warehouse 130 may occur for a variety of reasons. First, an owner may inadvertently post duplicate property listings for the same physical property, or may list a property listing and an agent list may list the same property listing. Second, an owner may choose to enlist several agents to list one or more properties of the owner and each agent may list the same property.

Due to differences and/or inaccuracies in the data that may be entered for a property listing 110, the above described listing attributes 115 may not be identical in duplicated property listings. For example, for the same physical property, one property listing 110 may include a zip code and another duplicate property listing 110 for the same physical property may not include the zip code. Similarly, other data in the listing attributes 115 may be textually different, omitted, may include typographical errors, and the like. As one example, address data for one entry may use "Street" or "Avenue" and a duplicate listing may use the abbreviation "St" for street or "Ave" for avenue. As another example, two property listings 110 for the same physical property may use different abbreviations for apartment numbers, such as one listing using "Apt. 202" and the other listing using "Unit 202" or "#202".

Accordingly, due to possible errors and/or inconsistencies in listing attributes 115 in potentially duplicate listings 110, other data in the data representing the property listings 110 may be useful in identifying with a higher degree of certainty, whether or not data warehouse 130 includes two or more property listings 110 that are duplicates of each other, even though there may be differences in one or more of the listing attributes 115 for those duplicate listings.

Property owners and/or their agents may include one or more images 111 (e.g., scanned images, images from digital capture devices, images from smartphones, tablets, pads, etc.) of their property listings 110 along with other data, such as the listing attributes 115, for example. Those images 111 may be uploaded or otherwise received by data warehouse 130 and stored for access by a computing device. Each image 111 may have an associated thumbprint value 112 that may be generated by a thumb printing algorithm that receives data representing the image 111 as an input, processes the image data according to the thumb printing algorithm, and generates as an output the thumbprint value 112 for the image 111. Images 111 may include interior and/or exterior images of the property listing, for example.

Data warehouse 130 may include a large number of property listings 110. A search to compare each property listing 110 with every other property listing 110 may not be practicable due to the computer resources and/or compute time necessary to do an exhaustive search. The number of property listings 110 to be searched may be reduced to a portion of the property listings 110 in data warehouse 130 by searching data warehouse 130 for property listings 110 that include data (e.g., 111-115) that match one or more search parameters. Results from the search may be further searched to determine if there is a similarity between images 111 in one or more property listings 110 by comparing thumbprint values 112 for images 111 in a property listing 110 with the thumbprint values 112 for images 111 in another property listing 110. Property listings 110 having one or more matching images 111 (e.g., as determined by thumbprint values 112) and having one or more listing attributes 115 that match may be potentially duplicated property listings 110. Removing, consolidating, or merging data in duplicated property listings 110 may increase data storage space in data warehouse 130, may reduce the number of property listings 110 that need to be searched in future searches, or may reduce data latency in queries made to data warehouse 130 (e.g., by computer resource 120).

In FIG. 1B, computer resource 120 may receive data representing attribute selection criteria 151 (e.g., data 151 received 152 from computing device 150). Attribute selection criteria 151 may include one or more attribute search keys (denoted as a1-aN) that may describe data representing one or more listing attributes 115 to be searched for in property listings 110 in data warehouse 130 using one or more of the attribute search keys a1-aN as search keys.

Data warehouse 130 may be searched 121 by the computer resource 120 with the computer resource 120 using the attribute search key(s) a1-aN to identify property listings 110 that include listing attributes 115 that match the attribute search key(s) a1-aN. Property listings 110 that match the attribute search key(s) a1-aN may be received 123 by the computing resource 120. As one example, the attribute search key a1 may be a single search key for a zip code (e.g., for Zip Code 95160). Each property listing 110 in data warehouse 130 that includes among its listing attributes 115 the zip code 95160 may be returned as a matching property listing 110 to computer resource 120.

To further refine the search for duplicate listings 110, computer resource 120 may generate data representing a list 125 of property listings 110 that matched the attribute search key. The list 125 may include image identifiers 113 for each image 111 in the property listings 110 having listing attributes 115 (e.g., for Zip Code 95160) that matched the attribute search key a1. The image identifiers 113 are denoted as ID-1-ID-N. Each image identifier 113 in the list 125 is associated with the thumbprint value 112 of its associated image 111. For example, if a property listing 110 includes N images 111, then for each image 111 the property listing 110 will include N thumbprint values 112, N image ID's 113, and N listing ID's 114. List 125 may constitute a single file or multiple files (e.g., two files), for example. In a single file, data associated with each image 111 (e.g., 113) may be compared with the data associated with others images 111 in the file, for example. On the other hand, if list 125 constitutes two files, then data associated with each image 111 (e.g., 113) in the first file may be compared with data associated with each the image 111 in the second file, for example. As one example, if the first file has 125 entries for 125 property listings 110 to be compared and the second file has 187 entries for 187 property listings 110 to be compared, then each entry in the second file is compared with all 125 entries in the first file. The number of entries in the first and second files may not be equal, so the number of cross-comparisons between the two files will be determined by the file having the highest number of entries. Each entry may include the listing attributes 115 associated with the property listing 110.

Optionally, list 125 may include data representing a thumb printing algorithm TA 126. Thumb printing algorithm TA 126 may be used to generate thumbprint values 112 for each image 111 to be compared, and the thumbprint values 112 generated, may be used instead of or in addition to the thumbprint values 112 that are included with each property listing 110. Thumb printing algorithm TA 126 may be different than the thumb printing algorithm used to generate the thumbprint values 112 that are included with each property listing 110. Thumb printing algorithm TA 126 may be applied to images 111 on a per image basis. Different thumb printing algorithms TA 126 may be applied on a per image basis to different images 111 to be compared. Thumbprint values 112 being compared need not be generated by the same thumb printing algorithm. For example, an image 111 having an associated 112 may be compared with a thumbprint value generated by TA 126.

The data representing the list 125 may be communicated 124 to the plurality of computer server resources 140. Each computer server resource (e.g., S1, S2, S3, . . . , Sn) may process the data representing the list 125 to generate a sub-set La-Ln of the data representing the list 125. Each computer server resource may select from its respective sub-set, a first set of image identifier 113' for a first property listing 110 and a second set of image identifiers 113" for a second property listing 110. Each computer server resource may search 147 the data warehouse 130 using the first set of image identifiers 113' and the second set of image identifiers 113" as search keys to retrieve a first set of thumbprint values 112' associated with images 111 identified by the first set of image identifiers 113' (e.g., from property listing 110') and a second set of thumbprint values 112" associated with images identified by the second set of image identifiers 113" (e.g., from property listing 110"). Image identifiers 113 within property listings 110 and among different property listings 11O are unique (e.g., a unique numeric identifier), such that the first and second set of image identifiers (113', 113") being searched for by computer server resource 51 are different than the first and second set of image identifiers (113', 113") being searched for by computer server resource 53, for example.

The search 147 by each of the computer server resources 140 may return thumbprint values 112 associated with the images 111 associated with the first and second set of image identifiers (113', 113"). For example, the first set of image identifiers 113' may return the first set of thumbprint values 112' and the second set of image identifier 113" may return the second set of thumbprint value 112". Each computer server resource may compare its respective first and second sets of thumbprint values (112', 112") with each other to determine if the first and second sets of thumbprint values (112', 112") match each other. For example, if a perceptual thumb printing function (e.g., a p-hash function) is used to generate the thumbprint values 112, then a comparison algorithm for perceptual thumbprint values may be used to compare the first and second sets of thumbprint values (112', 112") with each other. A match between thumbprint values 112 in the first and second sets of thumbprint values (112', 112") need not be an exact match. As one example, the first and second sets of thumbprint values may be approximately equivalent to each other or may be substantially similar to each other. For example, two images 111 of the same physical property listing 110 may differ in how the images were cropped, image file format (e.g., JPEG, GIF, PNG, BMP, BPG, TIFF, Raw, etc.) image resolution, image data size (e.g., in MB), differences in image metadata, image color space, image form factor (e.g., portrait or landscape), image scaling, image borders, differences in lighting on the property listing 110 at the time the image 111 was captured, differences in surrounding imagery, such as weather, flora and fauna, just to name a few. Each computer server resource may increment the image count 137 for each match between thumbprint values (112', 112") that is determined.

Subsequent to matches between thumbprint values 112 in the first and second sets of thumbprint values (112', 112") being determined, each computer server resource may communicate 149 data representing match results 148 (e.g., results 141-145 from servers S1-Sn) to the computer resource 120. The data representing the match results 141-145 may include the image identifiers (113', 113") for the respective matching thumbprint values (112', 112"). Optionally, the data representing the match results 141-145 may include data representing an algorithm that was used by the computer server resources (e.g., S1, S2, S3, . . . , Sn) to compare the first and second thumbprint values (112', 112") to each other. For example, comparing the first and second thumbprint values (112', 112") to each other may be computed using different comparison algorithms which may produce different comparison results. Including the data representing the algorithm used for the comparison in the match results 141-145 may be used to log which algorithm was used for future use and/or analysis of match results 141-145 by computer resource 120. For example, the comparison of the first and second thumbprint values (112', 112") may be an iterative process. A different comparison algorithm may be used for different iterations of the comparison. Computer resource 120 may analyze the match results 141-145 to determine which comparison algorithm produces more matches, fewer matches, or the same number of matches, for example. Comparison algorithms may be selected based on one or more factors, such as which algorithm produces the fewest false positive identifications of duplicate property listings 110, the algorithm that produces the fastest run time, or the algorithm that requires less memory space to run, for example.

Optionally, the data representing the match results 141-145 may include data representing a correlation value computed by the algorithm that was used by the computer server resources (e.g., S1, S2, S3, . . . , Sn) to compare the thumbprint values 112 to each other. The correlation value may be a number between 0 and 1. A correlation value of 0 may constitute an indication of no similarity between the images 111 associated with the thumbprint values 112 that were compared. A correlation value of 1 may constitute an indication of similarity between the images 111 associated with the thumbprint values 112 that were compared. The correlation value may be generated for each image 111 having its associated thumbprint value 112 was compared with the thumbprint value 112 of another image 111.

Computer resource 120 may compare the listing attributes 115 in the first property listing 110' with the listing attributes 115 in the second property listing 110" to determine how many of the listing attributes 115 being compared match each other. Each listing attribute 115 match that is determined may increment an attribute count.

Computer resource 120 may parse or otherwise inspect the data representing the match results 141-145 to generate data representing a report 160. Report 160 may include for each matching result (141-145), an entry that includes the listing identifier 114, the image identifier 113 for each image 111, the image count 137 of images 111 that matched, and the attribute count 139 of listing attributes 115 that matched. For example, a zip code listing attribute 115 in the first property listing 110 matching the zip code listing attribute 115 in the second property listing 110 may increment the attribute count by 1. Report 160 may include data represented as comma-separated values or column-separated values (e.g., a CSV format using a character, such as a ",", or ";" to delineate data fields).

Computer resource 120 may compute using the data representing the report 160, a weighted score for each entry in report 160. The weighted score may constitute a sum of the image count 137 multiplied by a first weighting factor and the attribute count 139 multiplied by a second weighting factor. The weighting factors for the image count 137 and attribute count 139 may not be the same. For example, if greater confidence in matching results is derived from images 111 that match between compared property listings 110 (e.g., based on matches between thumbprint values 112), then the image weighting factor may be set higher 60% (e.g., 0.6) and the attribute weighting factor may be set lower at 40% (e.g., 0.4). Alternatively, if more weight is placed on listing attributes 115 that match, then the attribute weighting factor may be set higher at 70% (e.g., 0.7) and the image weighting factor may be set lower at 30% (e.g., 0.3), for example.

Computer resource 120 may analyze the data representing the report 160 to identify potentially matching property listings 110 based on the weighted score of each entry in report 160. As one example, computer resource 120 may generate, based on the analysis of report 160, another report 170 of potentially duplicated property listings 110 where a correlation value of duplicate listings 110 may be indicated by a ranking of the weighted scores from highest to lowest, with property listings 110 having higher weighted scores being more likely to be duplicate listings than property listings 110 having lower weighted scores, for example. Computer resource 120 may sort weighted scores in a sort order from highest weighted scores to lowest weighted scores, or vice-versa, for example.

Figure 2:
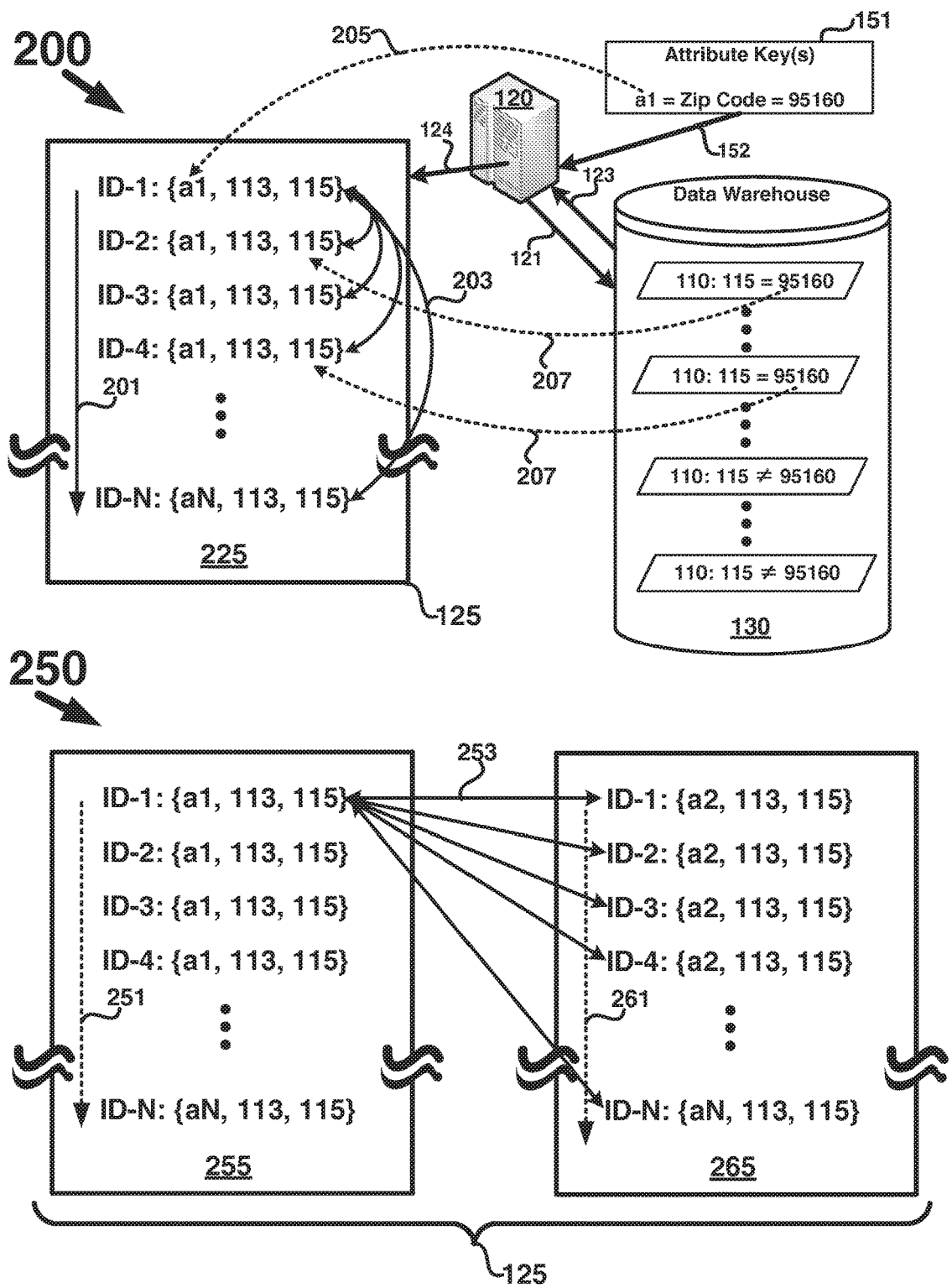
FIG. 2 depicts example of a list that may constitute a single file or multiple files.

FIG. 2 depicts example of a list 125 that may constitute a single file or multiple files. In example 200, a single file 225 may constitute the list 125. File 225 may include entries (e.g., ID-1-ID-N) for each listing 123 that matched the list search 121 of data warehouse 130 as described above in reference to FIG. 1B. Each entry in file 225 is compared 203 with all other entries in file 225. For example, comparison may begin with the first entry ID-1 being compared with all other entries (e.g., in comparison order denoted by arrow 201), followed by entry ID-2 being compared with all other entries that have not already been compared with 10-2. For example, since 10-1 was already compared with 10-2, a redundant comparison of 10-2 with 10-1 may be skipped.

In example 250, two files, 255 and 265 may constitute the list 125. Entries in each file may not be equal to each other. For example, file 265 may have more entries than file 255. Entries within the same file 255 or 265 are not compared with each other. Entries between the two files 255 and 266 are compared with each other. For example, entry ID-1 in file 255 may be compared against each entry ID1-ID-N in file 265, followed by entry ID-2 in file 255 being compared with each ID1-ID-N in file 265 and so forth with each entry in file 255. In example 250, if file 265 has more entries than file 255, then each entry in the larger file 265 may be compared with each entry in the smaller file 255, for example. Entries in files 255 and/or 265 may be compared in the order denoted by dashed lines 251 and 261, for example.

Referring back to example 200, attribute selection criteria 151 received 152 by computer resource 120 may include one or more attribute search keys (one is shown), such as attribute search key a1 for property listings 110 having listing attributes 115 that match zip code 95160, for example. Data warehouse 130 may have several property listings 110 having listing attributes 115 that match (e.g., 115=95160) the attribute search key a1=95160. Data warehouse 130 may have several property listings 110 having listing attributes 115 that do not match (e.g., 115≠95160) the attribute search key a1=95160. Other property listings 110 may not have listing attributes 115 for a zip code and those listings 110 would not be included in the search results. Search 121 by computer resource 120 may return results 123 for all property listings 110 in data warehouse 130 having listing attributes 115 that match (e.g., 115=95160) the attribute search key a1=95160 as denoted by dashed lines 207. File 225 may have each entry populated with the data for the attribute search key a1 and listing attributes 115 as denoted by dashed lines 205 and 207.

Figure 3:
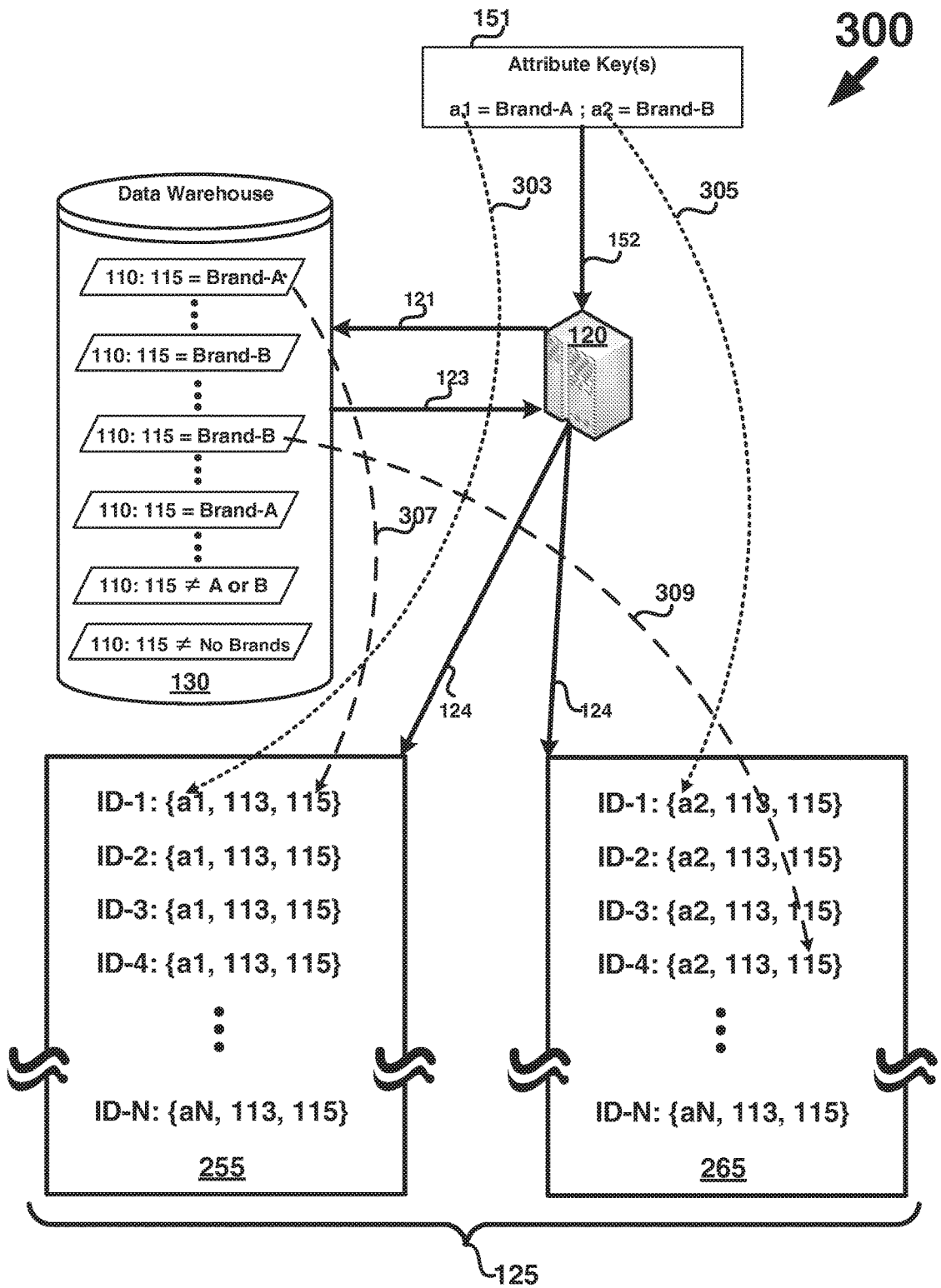
FIG. 3 depicts an example of two files generated from two attribute search keys.

FIG. 3 depicts an example of two files generated from two attribute search keys. In FIG. 3, attribute selection criteria 151 received 152 by computer resource 120 may include one or more attribute search keys, such as attribute search keys such as a1=Brand-A and a2=Brand-B. In some examples, brands A and B may be two different brand names owned by a common corporate entity, such as a vacation rental enterprise. In other examples, Brands A and B may be two different brand names owned by two separate corporate entities. In yet other examples, brand A may be a brand associated with corporate entity and brand B may be a brand associated with a target corporate entity that Brand A has already acquired or may acquire as part of a merger and/or acquisition.

In the example where brands A and B may be two different brand names owned by a common corporate entity, the corporate entity may desire to know how many property listings 110 are duplicated between the two brands A and B. For example if Brand-A has 10,000 property listings 110, Brand-B has 15,000 property listings 110, and 1,000 of the property listings 110 constitute duplicate listings, then the corporate entity actually has 24,000 unique property listings (A+B−Duplicates=10,000+15,000−1,000) and not 25,000 (A+B=10,000+25,000).

In the example where brands A and B may be two different brand names owned by two separate corporate entities, another corporate entity may be consider acquiring brands A and B and therefore may wish to know how many of the combined property listings of brands A and B are unique listings and how many are duplicate listings. The number of unique listings may factor into a financial valuation of the acquisition as part of a due diligence exercise.

In the example where Brand A is considering acquiring Brand B, the same due diligence exercise may apply and overlap of property listing inventory between brands A and B may be determined to arrive at the number of unique listings 110 that are listed with Brand B by factoring out duplicate listings that are listed with both Brand A and Brand B. For example, if Brand A has 9,000 listings, Brand B has 4,000 listings, and there are 500 duplicate listings, then the actual inventory of unique listings that Brand A may acquire is 4,000-500=3,500 unique listings.

Returning to FIG. 3, attribute search keys a1=Brand-A and a2=Brand-B may be used by computer resource 120 to search 121 data warehouse 130 for all property listings having attribute data 115 that match Brand-A and populate file 255 with data from matching listings. Similarly, computer resource 120 may search 121 data warehouse 130 for all property listings having attribute data 115 that match Brand-b and populate file 265 with data from matching listings. Data warehouse 130 may have listings 110 that don't match Brand-A or Brand-B, and may have other listings 110 that lack a listing attribute 115 for a brand. Those listings will not match the search keys (a1, a2) and will not be returned 123 as results from search 121 by computer resource 120.

Figure 4:
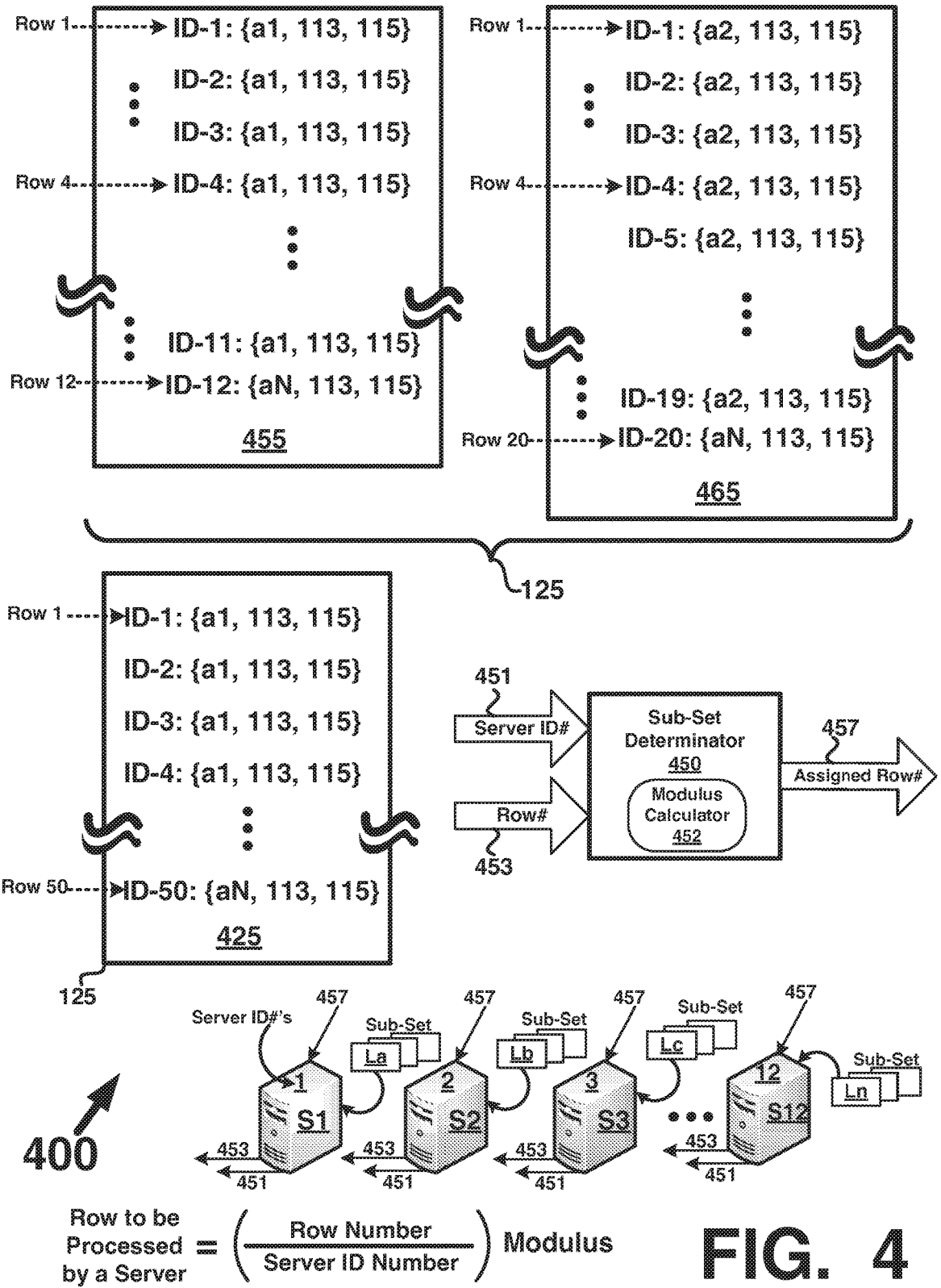
FIG. 4 depicts an example of determination of a sub-set of a list to be processed by multiple computing devices.

FIG. 4 depicts an example of determination of a sub-set of a list to be processed by multiple computing devices. In example 400 a sub-set determiner 450 may receive as input data a row number 453 from a list (e.g., list 125) and a server ID number 451. A modulus calculator 452 may compute a modulus of the row number 453 divided by the server ID number 451 and output data representing a row 457 in the list to be processed by a server. Each computer server resource (e.g., S1-S12) may communicate its server ID number 451 to the sub-set determinator 450 and increment the row number 453 from lowest row number to highest row number. Each computed modulus that equals the server ID number 451 is the row in the list to be processed by that server resource. Sub-set determinator 450 may be implemented internal to each server resource or external to each server resource (e.g., as hardware, software or both).

In FIG. 4 each computer server resource S1-S12 (e.g., a virtual machine and/or server) may be assigned a server ID number 1-12, for example. Files 455 and 465 may be assigned row numbers for each file entry such that file 455 may have rows 1-12 and file 465 may have rows 1-20 (e.g., files 455 and 465 may have different numbers of entries). Each computer serve resource S1-S12 may compute the row in the list 125 by determining the row number in the list (e.g., a row number in file 455 and/or 465), dividing the row number by its assigned server number and taking the modulus (MOD) of the quotient. If the MOD is equal to the server ID number, then that server processes that row in the single file or that row in both files (455, 465). In a single file 425, each row entry is compared with all other row entries. In two files (455, 465), row entries in one file (e.g., 465) are compared with all of the row entries in the other file (e.g., 455).

Figure 5:
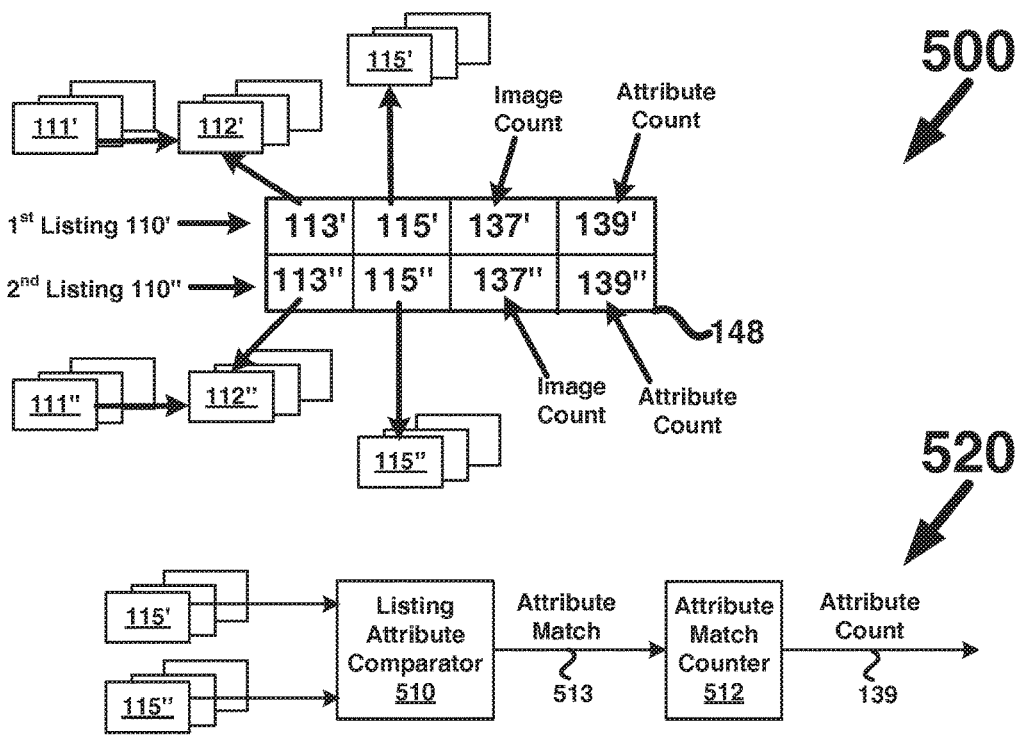
FIG. 5 depicts examples of reports.
Figure 5:
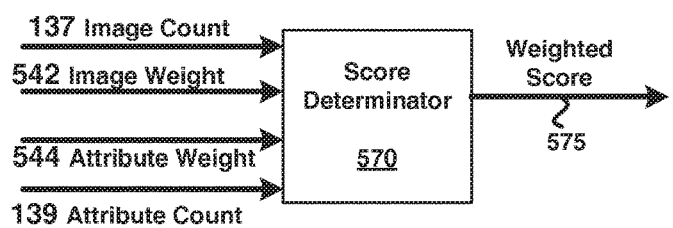

FIG. 5 depicts examples of reports. In example 500, match results 148 communicated 149 to computer resource 120 by the plurality of server resources 140 (e.g., match results 141-145 from servers 51-Sn) may include entries for each property listing 110' and 110" that were compared to each other. Each entry (e.g., along the row direction) may include the image identifiers 113' and 113", the listing attributes 115' and 115" and an image count 137' and 137" for listings 110' and 110" respectively. Each image identifier 113' and 113" are associated with the images 111' and 111" that were compared via their respective thumbprint values 112' and 112" to determine if the thumbprint values 112' and 112" matched each other. Each match incremented an image match counter that outputs data representing the image counts 137' and 137". Match results 148 may include more or less data than depicted in example 500. For example, match results 148 may include other data, such as the attribute count 139, the algorithm used to compare thumbprint values 112, the thumb printing function used to generate thumbprint values 112, just to name a few.

In example 520, the computer resource 120 and/or the plurality of server resources may compute an attribute count 514. Listing attributes 115' and 115" for each listing being compared (e.g., property listing 110' and 110") may be inputs to a listing attribute comparator 510 configured to compare data representing listing attribute 115' with data representing listing attribute 115" and to determine whether the listing attributes 115' and 115" match each other. If the listing attributes 115' and 115" are determined to match each other, then listing attribute comparator 510 outputs data representing a match 513. An attribute match counter 512 may increment data representing an attribute count 514 for each match determined by the listing attribute comparator 510.

For example, if listing attributes 115' and 115" are Zip Codes 95160 and 95160-2744 respectively, the listing attribute comparator 510 may determine that the Zip Codes match based on the first five digits matching and may be configured (e.g., via an algorithm) to ignore all characters after the hyphen sign "-", such that ZIP+4 Zip Codes may be compared to 5-Digit Zip Codes. Accordingly, the attribute count 514 would be incremented.

As another example, if listing attributes 115' and 115" are for Street Address 777 Birch Street and 777 Birch St, respectively, then a match may be determined by the listing attribute comparator 510 because the comparator 510 may be configured to recognize abbreviations in addresses, apartment names and numbers, states, countries, etc. Accordingly, the attribute count 514 would be incremented.

As yet another example, if listing attributes 115' and 115" are for geolocations of property listing 110' and 110" and listing attribute 115' has data representing a geolocation of {"latitude": 48.858844300000001, "longitude": 2 0.2943506} and listing attribute 115" has data representing a geolocation of {"latitude": 49.858877300029004, "longitude": 2.3943996}, then the listing attribute comparator 510 would not determine a match and the attribute count 514 would not be incremented. In some examples, a radius or distance from a longitude and latitude may be used to determine if listing attributes 115' and 115" for a geolocation match. For example, if listing attribute 115' includes data representing a first geolocation in longitude and latitude and listing attribute 115' includes data representing a second geolocation in longitude and latitude, then listing attributes 115' and 115" may be determined to match based on the second geolocation being within a predetermined radius of the first geolocation (e.g., within radius of 30 meters or less).

In example 540 a report 160 may be formatted as a number of entries (e.g., in table, file, array or other data structure). For example, report 160 may be formatted as a comma-separated values or column-separated values (CSV list) with the character semi-colon ";" character as a data field separator. List 160 may have N entries for listings 110 that were compared and determined to have one or more images 111 that matched. Each entry may include the listing ID's 114, the image ID's 113, image count 137, and attribute count 139. Optionally, each entry may include an image weighting factor 542 and an attribute weighting factor 544. Weighting factors (542, 544) may be the same or may be different among the entries in report 160.

In example 560, data representing the report 160 may be analyzed by computer resource 120 to identify potentially matching property listings 110 based on the weighted score of each entry in report 160. As one example, a score determinator 570 may receive as inputs, data representing the image count 137, the image weighting factor 542, the attribute count 514, and the image weighting factor 542. Score determinator 570 may compute the weighted score for an entry as: Weighted Score=Image Count×Image Weighting Factor+Attribute Count×Attribute Weighting Factor, for example.

Figure 6:
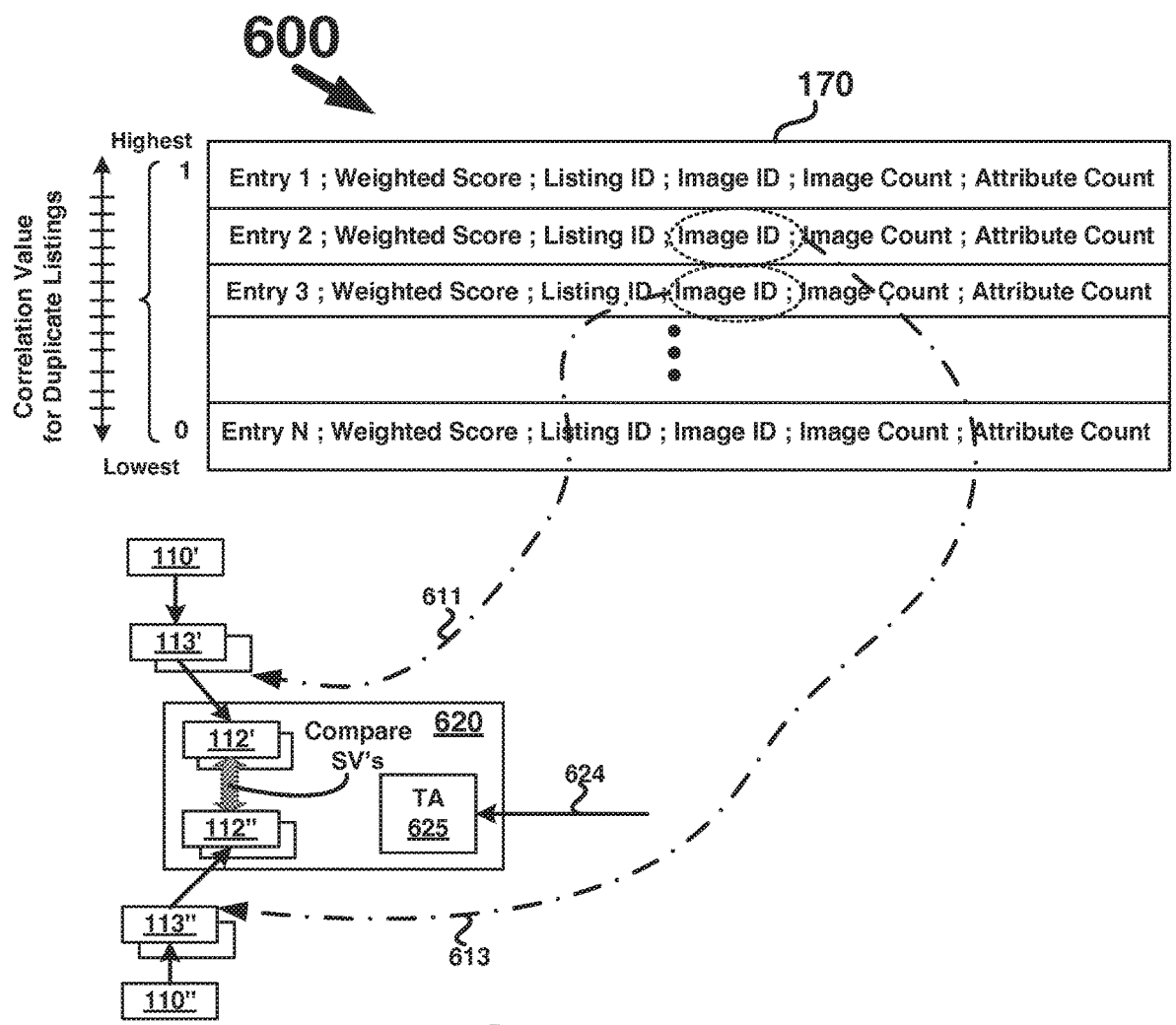
FIG. 6 depicts an example of sorted weighted scores.

FIG. 6 depicts an example 600 of sorted weighted scores. In FIG. 6, computer resource 120 may sort data representing the weighted scores 575 into a sort order from lowest weighted score (e.g., a low correlation value of 0 that listings 110 are duplicates) to highest weighted score (e.g., a high correlation value of 1 that property listings 110 are duplicated). The computer resource may analyze data associated with each weighted score to determine if the score is indicative of property listings 110 with higher weighted scores being duplicate property listings 110. As one example, for correlation values in a range from 0 to 1, a value of 0.7 or higher may be indicative of duplicate property listings 110. In other examples, a value of 0.8 or higher for the correlation value may be indicative of duplicate property listings 110. Actual values for the correlation value may be application dependent and are not limited to the examples described and/or depicted herein. A predetermined value for the correlation value may be set (e.g., >0.5 or ≥0.66) and a correlation value that meets and/or exceeds the predetermined value is indicative of duplicate listings 110, for example. A control signal may be generated in response to the correlation value having the predetermined value and/or being within a predetermined range. The control signal (e.g., a digital logic signal or data) may be generated by computer resource 120, computing device 150, or computer server resources 140, for example.

Computer resource may extract 611 and 613 data, such as image identifiers from the entries in report 170 and re-run the thumbprint value comparison process using different thumb printing functions TA 625 (e.g., different thumb printing functions) to yield different thumbprint values for comparison in a compute engine 620 (e.g., the plurality of server resources). The process may be iterative with different thumb printing functions TA 625 being received 624 by compute engine 620. The resulting weighted scores from re-running the thumbprint value comparison process may be compared to the weighted scores in report 170 to determine if confidence in listings 110 being duplicate listings or not being duplicate listings may be justified. For example, if re-running the thumbprint value comparison process results in high weighted scores for entries 1 and 2, then confidence in those listings being duplicate listings may be justified.

Figure 7:
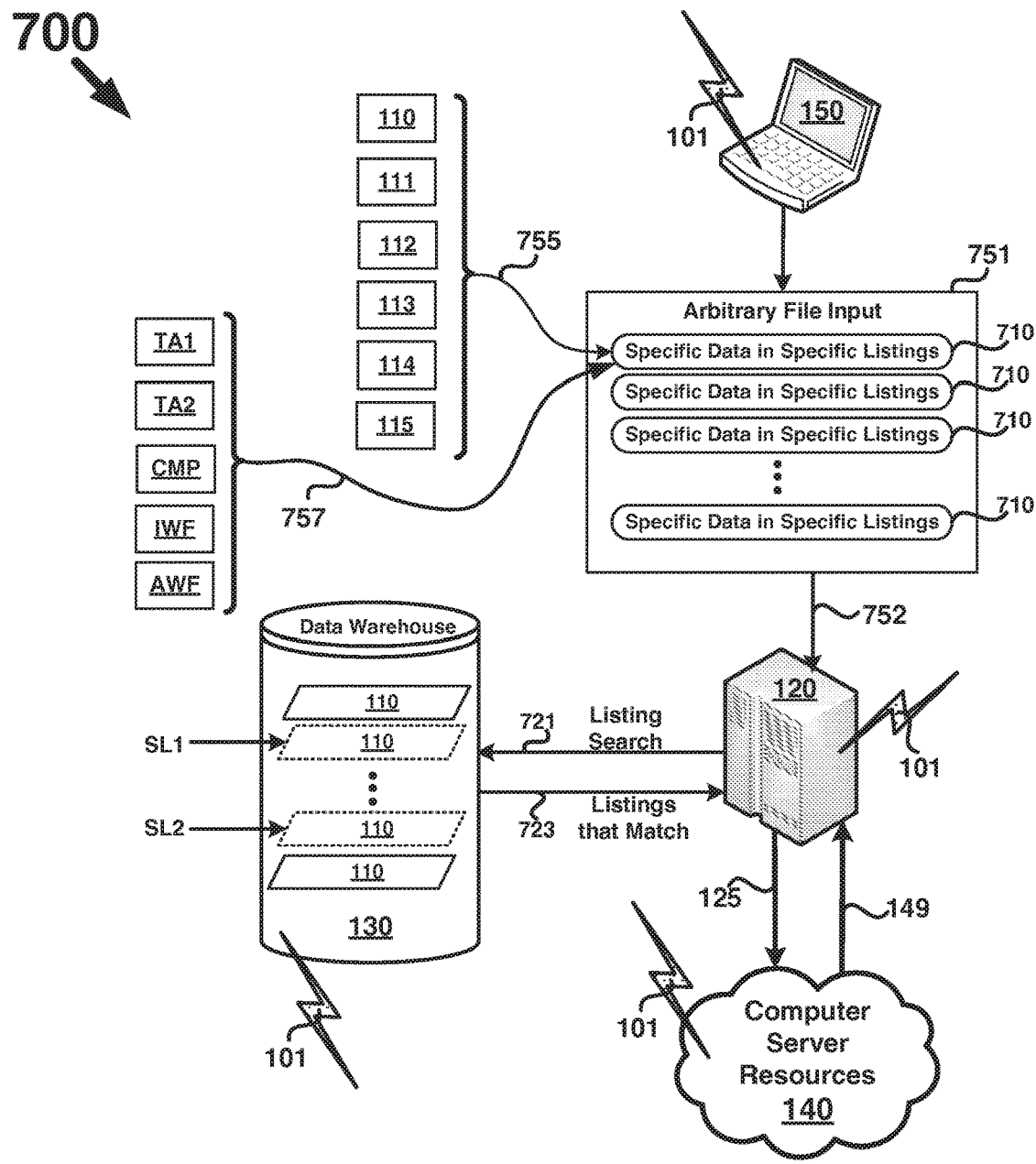
FIG. 7 depicts an example of arbitrary file input.

FIG. 7 depicts an example of arbitrary file input. In example 700, computer resource 120 may receive 752 data representing arbitrary file input 751 that includes data representing specific data in specific listings 710 to be searched for 721 in data warehouse 130. Matching results from search 721 may be received 723 by computer resource 120 and may be processed by computer resource 120 and/or the plurality of server resources 140 as was described above in reference to FIGS. 1A-6, for example. Data 710 may include 755 data representing specific property listings 110 and/or other data included in the specific property listing 110, such as data representing images 111, thumbprint values 112, image identifiers 113, listing identifiers 114 and listing attributes 115, for example.

Data 710 may include 757 or have pointer, links, or the like to other data including but not limited to one or more thumb printing algorithms (TA1, TA2) to be applied to images 111 to generate thumbprint values 112, an algorithm CMP for comparing thumbprint values 112 to each other, image weighting factors IWF, and attribute weighting factors AWF, for example. Thumb printing algorithms (TA1, TA2) may constitute hashing algorithms (e.g., a p-hash algorithm) and generated thumbprint values 112 may constitute hash values, for example.

As one example, in reference to FIG. 6, if entries in report 170 require further processing to double check or refine their weighted scores, compute engine 150 may generate data representing the arbitrary file input 751 and data in file 751 may select specific listings 110 (denoted in dashed line in data warehouse 130) and their associated data for further processing, such as re-thumb printing the images 111 using TA1 and/or TA2 to generate new thumbprint values 112 for each image 111. File 751 may different weighting factors IWF and/or AWF to be used in a re-scoring of the results for the selected listings 110. The re-scoring may be used to verify confidence or lack of confidence in the previous weighted scores, that is, if the weighted scores were high (e.g., in a range from about 0.8 to about 1) and the re-scoring results in weighted scores within that range, then confidence in the listings being duplicates may be justified, for example. On the other hand, if the re-scoring results in weighted scores outside that range (e.g., below about 0.6), then confidence in the listings being duplicates may not be justified, for example.

Figure 8:
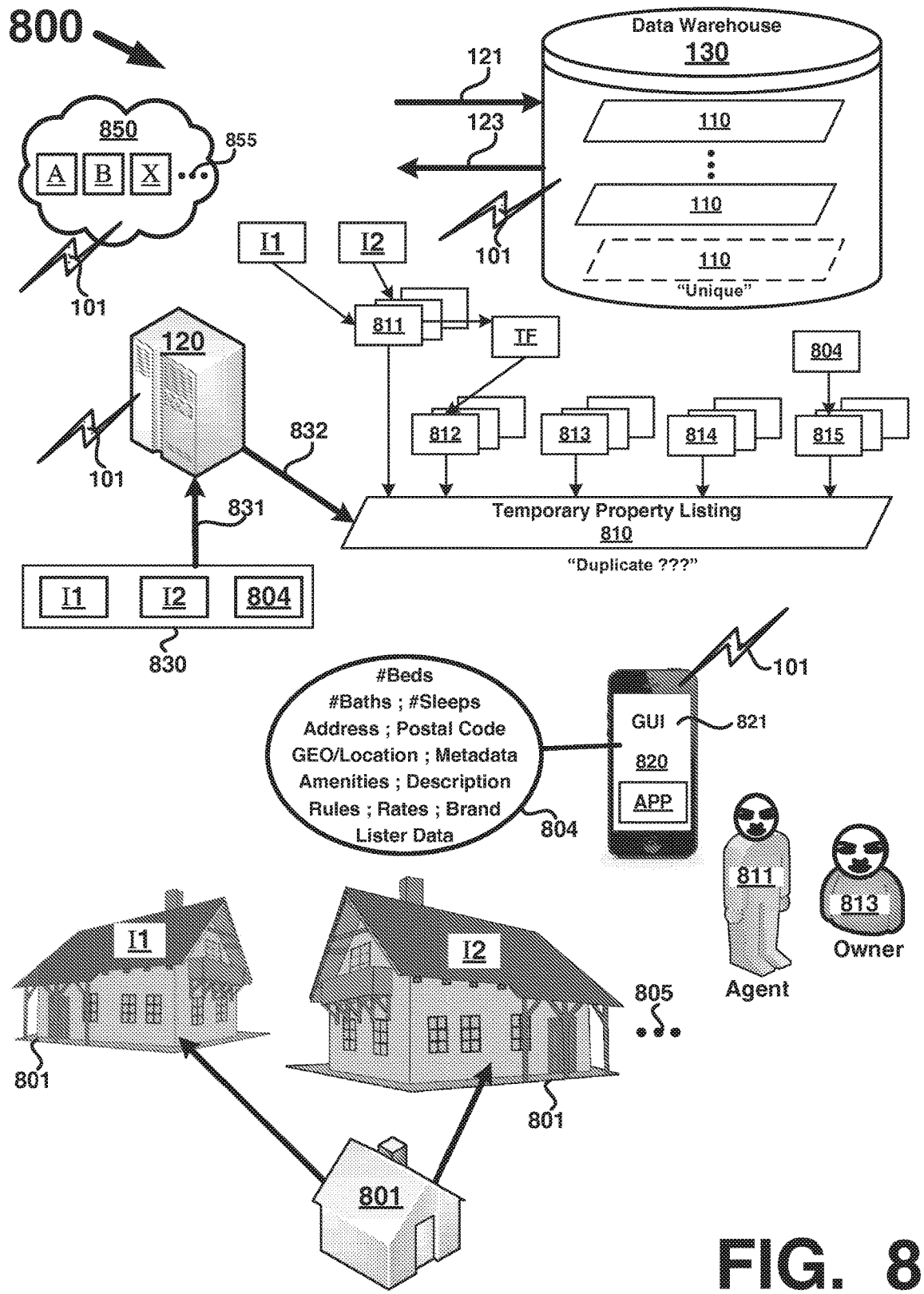
FIG. 8 depicts one example of vetting data representing a newly received property listing.

FIG. 8 depicts one example 800 of vetting data representing a newly received property listing. In the example 800 of FIG. 8 an owner 813 and/or an agent 811 for an owner may list a rental property 801 with a vacation rental management entity 850. A computing device 820 may be used to enter information 804 related to the rental property 801 using an application APP presented via a GUI on a display 821 of computing device 820. Images (I1, I2) of the rental property 801 may be captured (e.g., by device 820) and may be included for use in promoting rental of the rental property 801 by the vacation rental management entity 850 (e.g., on a website run by entity 850). There may be more or fewer images than depicted as denoted by 805.

The APP on computing device 820 may package the data representing images (I1, I2) and the data 804 describing the rental property 801 as data 830 that is received 831 by computing resource 120. Prior to creating an instance of a new property listing 110 in data warehouse 130, computing resource 120 may generate 832 data representing a temporary property listing 810. The temporary property listing 810 may include data similar to property listings 110, such as data for images 811, thumbprint values 812 of the images 811, image identifiers 813 for each image 811, listing identifiers 814, and listing attributes 815. Listing attributes 815 may be generated by computing resource 120 parsing data 804 to extract information associated with rental property 801. Computer resource 120 may apply a thumb printing function TF on image data 811 to generate thumbprint values 812. The thumb printing function TF may be the same or may be different than a thumb printing function used to generate thumbprint values 112 in property listings 110 in data warehouse 130.

Computer resource 120 may receive 152 or otherwise extract from 815 an attribute search key to search 121 data warehouse 130 for listings 110 having images 111 having thumbprint values 112 that may match thumbprint values 812, as has been described above in reference to FIGS. 1A-7. If matching images are determined, based on comparing thumbprint values 812 with thumbprint values 112, then temporary property listing 810 may be a duplicate listing and the data representing the temporary property listing 810 may not be added to the data warehouse 130 as a new listing, such that the data representing the temporary property listing 810 may be barred from storage in the data warehouse 130. On the other hand, if matching images are not determined, then the data representing the temporary property listing 810 may be added as a new "unique" property listing 110 (denoted in dashed line) in data warehouse 130.

In example 800, vacation rental management entity 850 may operate several brand names A, B, X, or other brands as denoted by 855. Owner 813 and/or agent 811 may have previously listed rental property 801 with one or more of those brands and may be attempting to list the same property with a different brand operated by vacation rental management entity 850. The vetting process of checking listing attribute data and image data with existing listing may be used prevent duplication of listings, to reduce data storage capacity requirements for data warehouse 130 by eliminating or reducing wasted data storage space that would otherwise be caused by duplicated listings. Searches of data warehouse 130 by computer resource 130 and/or computer server resources 140 may be faster due to fewer listing to search when the population of listings 110 does not include duplicated listings.

Figure 9:
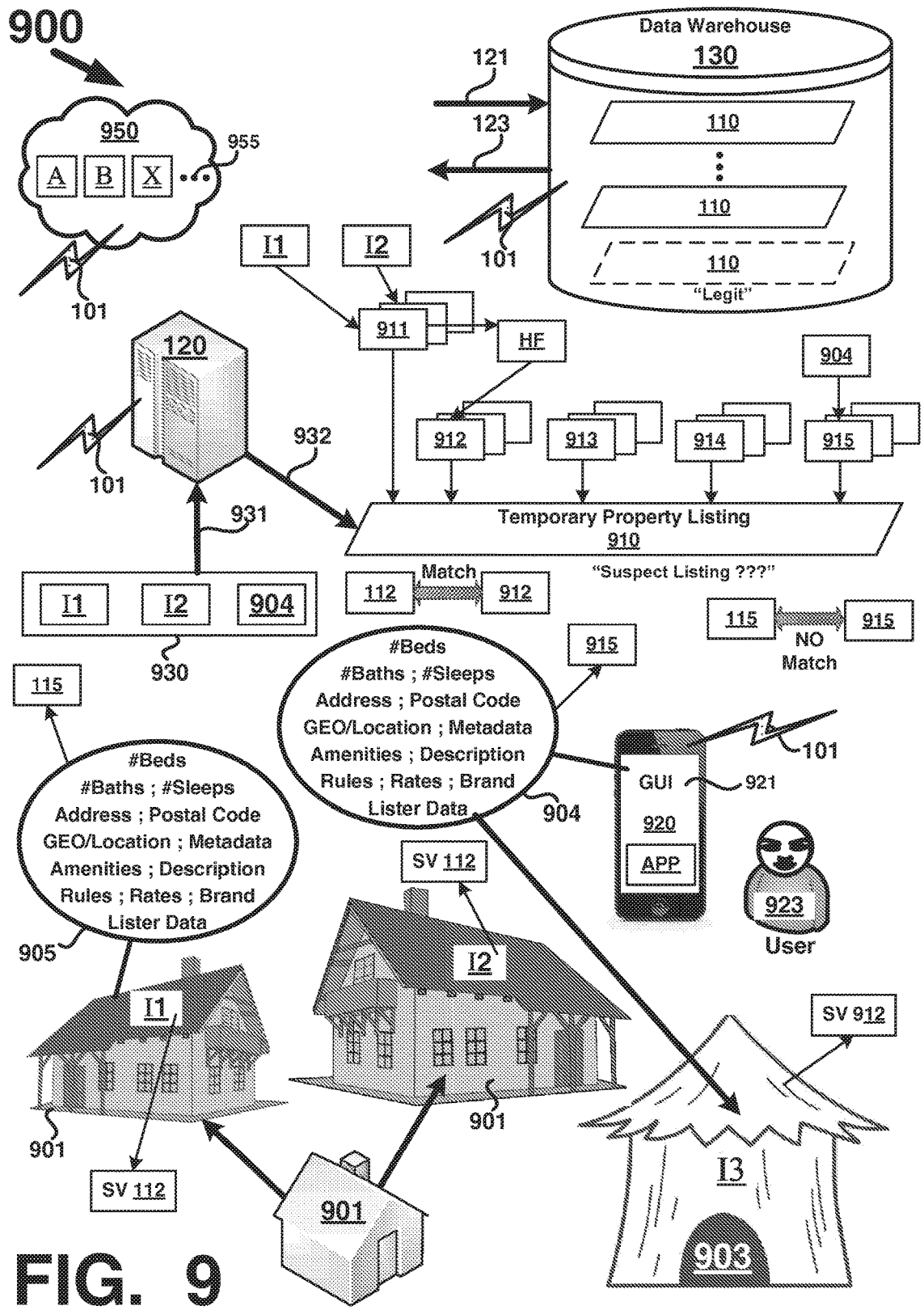
FIG. 9 depicts another example of vetting data representing a newly received property listing.

FIG. 9 depicts another example 900 of vetting data representing a newly received property listing. In FIG. 9, a user 923 may attempt to post images (I1, I2) of another rental property 901 with a listing for property 903, thereby misrepresenting the appearance (e.g., actual image of the property 13) of the actual rental listing 903. In example 900, information 905 associated with the misrepresented images (I1, I2) is different than the information 904 associated with the actual rental listing 903. For example, ZIP Code, Address, number of bed rooms, number of bath rooms, number of sleeps and geolocation data may be different between rental listings 901 and 903.

Information 930 that includes the listing attributes 904 and the misrepresented images (I1, I2) may be received 931 by computer resource 120 and be processed in the manner described above for FIG. 8. In FIG. 9, a comparison of the thumbprint values 912 with thumbprint values 112 from data warehouse 130 may indicate a match due to misrepresented images (I1, I2) having been copied from listings 110 that are already in data warehouse 130. However, listing attributes 115 associated with the images 111 for thumbprint values 112 may not match the listing attributes 915 for rental 903 due to the differences noted above. Accordingly, the image count 137 for thumbprint values 112 and 912 may be 2 for both of the images (I1, I2), but the attribute count 139 may be 0 due to differences between the source data 905 and 904.

Computer resource 120 may detect and report that the attempted listing of rental 903 is not legitimate and may flag its data as "suspect" and prevent a legitimate listing 110 from being stored in data warehouse 130. Furthermore, computer resource 130 may flag the data for rental 903 as potentially fraudulent and generate data representing the fraudulent information.

As one example, user 923 may have failed to pay listing fees or failed to comply with some other contractual obligation to vacation rental management entity 850. Consequently, access credentials, membership or the like of user 923 may have been revoked. However, the user 923 may use another user name, email address and password to establish a new account with vacation rental management entity 850. User 923 may attempt to relist rental unit 903 with vacation rental management entity 850 using the copied images (I1, I2); however, the root information related to rental 903 may still be the same and the inability to change the physical address and other attributes may allow for the detection of the fraud/suspect listing using computer resource 120, computer server resources 140 and data warehouse 130.

Figure 10:
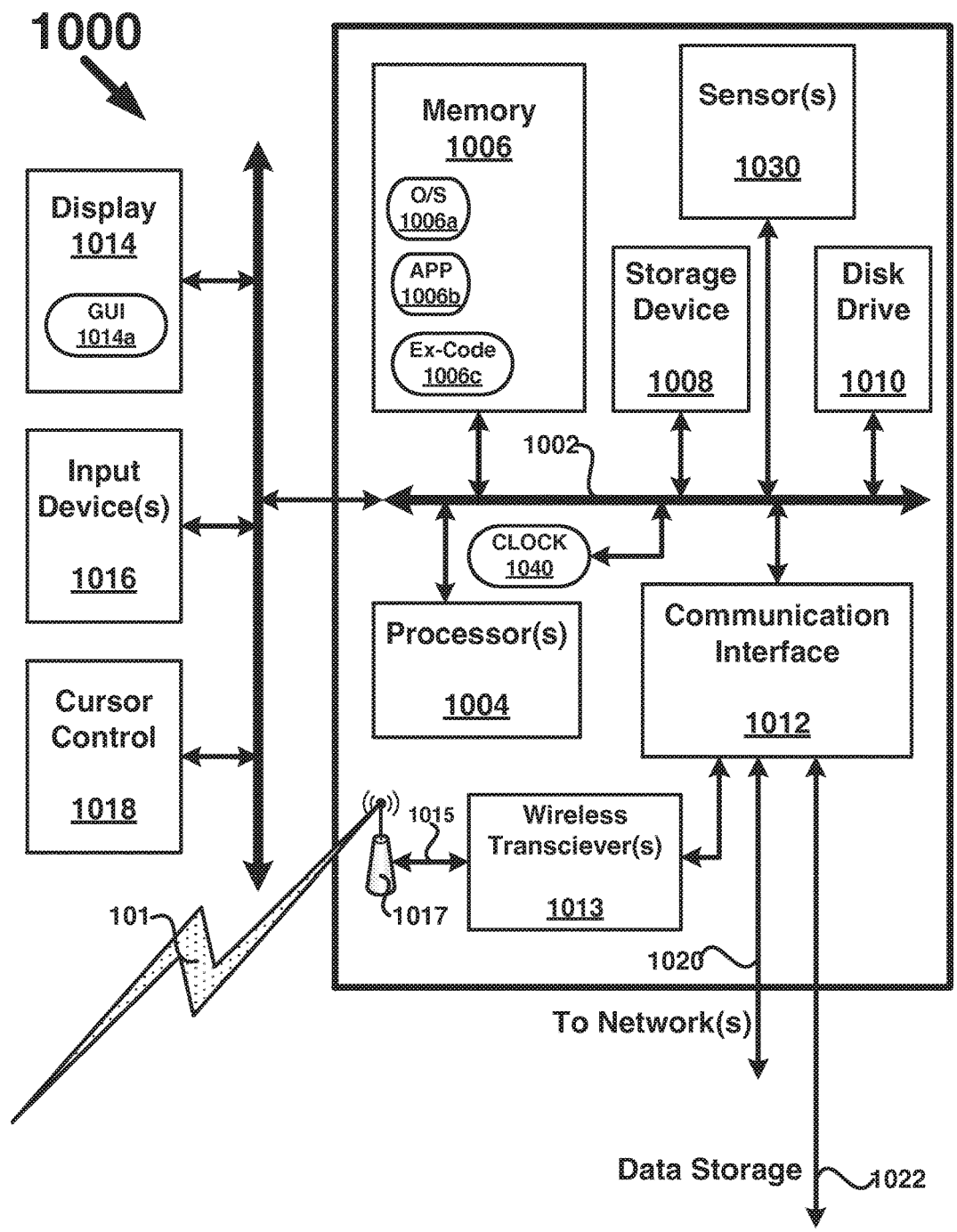
FIG. 10 depicts one example of a computer system.

FIG. 10 depicts one example of a computer system. FIG. 10 illustrates an exemplary computer system 1000 suitable for use in one or more systems, devices, compute engines, apparatus, traveler devices, owner devices, wireless devices, wireless systems, backend systems, front end systems, networked systems, data stores, data warehouses, vacation rental management systems, platforms, data storage devices, data storage systems, external resources, host devices or others described in reference to FIGS. 1A-9. In some examples, computer system 1000 may be used to implement computer programs, algorithms, an application (APP), an application programming interface (API), configurations, methods, processes, or other software to perform the above-described techniques. Computer system 1000 may include circuitry, hardware, and other electronic systems to perform the above-described techniques. Computer system 1000 may include a bus 1002 or other communication mechanism for communicating information, which interconnects subsystems and devices, such as one or more processors 1004 (e.g., µC, µP, DSP, ASIC, FPGA, Baseband, etc.), system memory 1006 (e.g., RAM, SRAM, DRAM, Flash), storage device 1008 (e.g., Flash, ROM), disk drive 1010 (e.g., magnetic, optical, solid state), communication interface 1012 (e.g., modem, Ethernet, WiFi, Cellular), display 1014 (e.g., CRT, LCD, LED, OLEO, touch screen), input device 1016 (e.g., keyboard, stylus, touch screen, mouse, track pad), and cursor control 1018 (e.g., mouse, trackball, stylus). Some of the elements depicted in computer system 1000 may be optional, such as elements 1014-1018, and one or more clocks 1040 which may provide temporal data, for example, one or more sensors 1030 which may provide location data, rate of motion data and other data associated with movement, and computer system 1000 need not include all of the elements depicted. Display 1014 may present a user interface (UI), such as a graphical user interface (GUI) 1014a. Memory 1006 may include computer executable programs and/or data embodied in a non-transitory computer readable medium, such as an operating system (OS) 1006a, an application (APP) 1006b, and executable code (Ex-Code) 1006c, for example. APP 1006b may be an application that may be downloaded or otherwise installed from a location such as an application store (e.g., Google Play® or the App Store®), for example.

According to some examples, computer system 1000 performs specific operations by one or more processors 1004 executing one or more sequences of one or more instructions stored in system memory 1006. Such instructions may be read into system memory 1006 from another non-transitory computer readable medium, such as storage device 1008 or disk drive 1010 (e.g., a HOD or SSD). In some examples, circuitry may be used in place of or in combination with software instructions for implementation. The term "non-transitory computer readable medium" refers to any tangible medium that participates in providing instructions and/or data to processor(s) 1004 for execution. Such a medium may take many forms, including but not limited to, non-volatile media and volatile media. Non-volatile media includes, for example, optical, magnetic, or solid state disks, such as disk drive 1010. Volatile media includes dynamic memory, such as system memory 1006. Common forms of non-transitory computer readable media includes, for example, floppy disk, flexible disk, hard disk, SSD, magnetic tape, any other magnetic medium, CD-ROM, DVD-ROM, Blu-Ray ROM, USB thumb drive, SD Card, any other optical medium, punch cards, paper tape, any other physical medium with patterns of holes, RAM, PROM, EPROM, FLASH-EPROM, any other memory chip or cartridge, or any other medium from which a computer may read.

Sensor(s) 1030 may include but are not limited to one or more inertial sensors (e.g., an accelerometer, a multi-axis accelerometer, a gyroscope, a magnetometer, etc.), an altimeter, and a barometer, for example. One or more sensors in sensor(s) 1030 may be used to determine location data for a device that includes computer system 1000 and/or is in communication with computer system 1000 (e.g., a client device, a smartphone, a tablet, a pad, a laptop, PC, a wireless device, a portal computing device, a computing device, a networked computing device, a platform, a backend service, etc.). One or more of the memory 1006, storage device 1008, or disk drive 1010 may be accessed as a data store for location data from sensor(s) 1030 or other systems in communication (e.g., via communications interface 1012) the computer system 1000. Location data may be communicated to/from the computer system 1000 via one or more of the wireless transceivers 1013.

For example, radio frequency signal sources including but not limited to GPS satellite signals (e.g., signals from one or more GPS satellites), terrestrial location transmitters (e.g., one or more cellular towers), WiFi signals, WiMAX signals, WiFi routers, WiFi access points, Bluetooth signals (e.g., Bluetooth beacons), near field communication signals, iBeacons, data from external resource, and platform. Other signal and/or data sources for location data may include but are not limited to audio signals (e.g., ultrasonic signals) and signals and/or data generated by location tracking software (e.g., internal to and/or external to computer system 1000), for example. In some examples, location data and/or signals may be communicated wireless communications link and/or a wired communications link. Location data accessed by computer system 1000 may include but is not limited to a location history data, for example. The location data may be updated, revised or otherwise change on a dynamic basis as a guest device moves around in area.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media may include coaxial cables, copper wire, and fiber optics, including wires that comprise bus 1002 for transmitting a computer data signal or other signals (e.g., from hardware or circuitry). In some examples, execution of the sequences of instructions may be performed by a single computer system 1000. According to some examples, two or more computer systems 1000 coupled by communication link 1020 (e.g., LAN, Ethernet, PSTN, USB, or wireless network) may perform the sequence of instructions in coordination with one another. Computer system 1000 may transmit and receive messages, data, and instructions, including programs, (i.e., application code), through communication link 1020 and communication interface 1012. Received program code may be executed by processor 1004 as it is received, and/or stored in disk drive 1010, or other non-volatile storage for later execution. Computer system 1000 may optionally include a wireless transceiver 1013 coupled with the communication interface 1012 and coupled 1015 with an antenna 1017 for receiving and generating RF signals (e.g., 101), such as from a WiFi network, WiMAX network, BT radio, Cellular network, networked computing resources, external wireless resources, client devices, owner devices, near field communication (NFC), satellite network, data storage network, or other wireless network and/or wireless devices, for example. Communications interface 1012 may be coupled 1022 with data storage external to computer system 1000. Communications interface 1012 may be coupled with external resources and/or systems, such as those depicted in FIGS. 1A-9, for example. Computer system 1000 may be used to implement a networked computing device (e.g., 120, 140, 130), for example.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C #, Adobe® Integrated Runtime™ (Adobe® AIR™), ActionScript™, Flex™, Lingo™, Java™ Javascript™, Ajax, Perl, COBOL, Fortran, ADA, XML, MXML, HTML, DHTML, XHTML, HTTP, XMPP, PHP, and others. Design, publishing, and other types of applications such as Dreamweaver®, Shockwave®, Flash®, Drupal and Fireworks® may also be used to implement the described techniques. Database management systems (i.e., "DBMS"), search facilities and platforms, web crawlers (i.e., computer programs that automatically or semi-automatically visit, index, archive or copy content from, various websites (hereafter referred to as "crawlers")), and other features may be implemented using various types of proprietary or open source technologies, including MySQL, Oracle (from Oracle of Redwood Shores, Calif.), Solr and Nutch from The Apache Software Foundation of Forest Hill, Md., among others and without limitation. The described techniques may be varied and are not limited to the examples or descriptions provided.

The structures and/or functions of any of the above-described features may be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described conceptual techniques are not limited to the details provided. There are many alternative ways of implementing the above-described conceptual techniques. The disclosed examples are illustrative and not restrictive.

What is claimed is:

1. A computer-implemented method for identifying duplicate listings in a data store, comprising:
   obtaining a first set of summary data values associated with a first listing, each summary data value of the first set of summary data values corresponding to an image for the first listing;
   obtaining a second set of summary data values associated with a second listing, each summary data value of the second set of summary data values corresponding to an image for the second listing;
   comparing the first set of summary data values and the second set of summary data values to determine which summary data values within the first set of summary data values match at least one summary data value within the second set of summary data values;
   generating an image count value indicative of the number of summary data values in the first set of summary data values that match at least one summary data value in the second set of summary data values;
   obtaining a first set of attributes associated with the first listing and a second set of attributes associated with the second listing;
   comparing the first set of attributes and the second set of attributes to determine which attributes within the first set of attributes match at least one attribute within the second set of attributes;
   generating an attribute count value indicative of the number of attributes in the first set of attributes that match at least one attribute within the second set of attributes; and
   in response to determining that the image count value satisfies an image count threshold and that the attribute count value satisfies an attribute count threshold, identifying the first listing as potentially duplicative of the second listing.

2. The computer-implemented method of claim 1, wherein determining that the image count value satisfies the image count threshold and that the attribute count value satisfies the attribute count threshold comprises determining a correlation value based at least partly on one or more of the image count value or the attribute count value and determining that the correlation value satisfies a correlation value threshold.

3. The computer-implemented method of claim 2, wherein the correlation value is calculated as a sum of the image count value multiplied by a first weighting factor and the attribute count value multiplied by a second weighting factor.

4. The computer-implemented method of claim 1 further comprising deleting the first listing in response to identification of the first listing as potentially duplicative of the second listing.

5. The computer-implemented method of claim 1 further comprising merging the first and second listings into a single listing.

6. The computer-implemented method of claim 5, wherein the single listing is associated with a third set of attributes, the third set of attributes representing a combination of the first set of attributes and the second set of attributes.

7. A system comprising:
   a physical data store including:
      a first set of attributes associated with a first listing;
      a first set of summary data values associated with the first listing, each summary data value of the first set of summary data values corresponding to an image for the first listing;
      a second set of attributes associated with a second listing; and
      a second set of summary data values associated with the second listing,
   each summary data value of the second set of summary data values corresponding to an image for the second listing; and
   a processor in communication with the physical data store and configured with computer-executable instructions to at least:
      compare the first set of summary data values and the second set of summary data values to determine which summary data values within the first set of summary data values match at least one summary data value within the second set of summary data values;
      generate an image count value indicative of the number of summary data values in the first set of summary data values that match at least one summary data value in the second set of summary data values;
      compare the first set of attributes and the second set of attributes to determine which attributes within the first set of attributes match at least one attribute within the second set of attributes;
      generate an attribute count value indicative of the number of attributes in the first set of attributes that match at least one attribute within the second set of attributes; and
      in response to a determination that the image count value satisfies an image count threshold and that the attribute count value satisfies an attribute count threshold, identify the first listing as potentially duplicative of the second listing.

8. The system of claim 7, wherein to generate the first set of summary data values the processor is further configured with the computer-executable instructions to at least process a set of images for the first listing according to a hash algorithm, wherein each summary data value of the first set of summary data values is a hash of a corresponding image within the set of images.

9. The system of claim 8, wherein the hash algorithm implements a perceptual hashing function.

10. The system of claim 7, wherein the processor is further configured with the computer-executable instructions to at least identify the first and second listings based at least partly on a determination that at least one attribute within the first set of attributes matches at least one attribute within the second set of attributes.

11. The system of claim 10, wherein the processor is further configured with the computer-executable instructions to at least make the determination that the at least one attribute within the first set of attributes matches the at least one attribute within the second set of attributes based at least partly on implementation of a search utilizing a search key matching the at least one attribute within the first set of attributes.

12. The system of claim 7, wherein the processor is further configured with the computer-executable instructions to at least delete the first listing in response to identification of the first listing as potentially duplicative of the second listing.

13. The system of claim 12, wherein the processor is further configured with the computer-executable instructions to delete the first listing by replacement of the first listing with a reference to at last one of the second listing or a combined listing generated as a combination of the first and second listings.

14. Non-transitory computer-readable storage media comprising computer-executable instructions that, when executed by a computing system, cause the computing system to at least:
   obtain a first set of summary data values associated with a first listing, each summary data value of the first set of summary data values corresponding to an image for the first listing;
   obtain a second set of summary data values associated with a second listing, each summary data value of the second set of summary data values corresponding to an image for the second listing;
   compare the first set of summary data values and the second set of summary data values to determine which summary data values within the first set of summary data values match at least one summary data value within the second set of summary data values;
   generate an image count value indicative of the number of summary data values in the first set of summary data values that match at least one summary data value in the second set of summary data values;
   obtain a first set of attributes associated with the first listing and a second set of attributes associated with the second listing;
   compare the first set of attributes and the second set of attributes to determine which attributes within the first set of attributes match at least one attribute within the second set of attributes;
   generate an attribute count value indicative of the number of attributes in the first set of attributes that match at least one attribute within the second set of attributes; and
   in response to a determination that the image count value satisfies an image count threshold and that the attribute count value satisfies an attribute count threshold, identify the first listing as potentially duplicative of the second listing.

15. The non-transitory computer-readable storage media of claim 14, wherein the computer-executable instructions further cause the computing system to at least delete the first listing in response to identification of the first listing as potentially duplicative of the second listing.

16. The non-transitory computer-readable storage media of claim 14, wherein to compare the first set of summary data values and the second set of summary data values the computer-executable instructions cause the computing system to at least compare each summary data value within the first set of summary data values to each summary data value within the second set of summary data values.

17. The non-transitory computer-readable storage media of claim 14, wherein the computer-executable instructions further cause the computing system to at least:
   generate the first set of summary data values by processing a set of images for the first listing according to a first algorithm, wherein each summary data value of the first set of summary data values is a summary data value of a corresponding image within the set of images for the first listing; and
   generate the second set of summary data values by processing a set of images for the second listing according to the first algorithm, wherein each summary data value of the second set of summary data values is a summary data value of a corresponding image within the set of images for the second listing.

18. The non-transitory computer-readable storage media of claim 17, wherein the computer-executable instructions further cause the computing system to at least verify the first listing as duplicative of the second listing, and wherein, to verify the first listing as duplicative of the second listing, the computer-executable instructions further cause the computing system to:
   generate a third set of summary data values by processing the set of images for the first listing according to a second algorithm, each summary data value of the third set of summary data values corresponding to an image of the set of images for the first;
   generate a fourth set of summary data values by processing set of images for the second listing according to the second algorithm, each summary data value of the third set of summary data values corresponding to an image of the set of images for the second;
   compare the third set of summary data values and the fourth set of summary data values to determine which summary data values within the third set of summary data values match at least one summary data value within the fourth set of summary data values;
   generate a second image count value indicative of the number of summary data values in the third set of summary data values that match at least one summary data value in the fourth set of summary data values; and
   determine that the second image count value satisfies a second image count threshold.

19. The non-transitory computer-readable storage media of claim 14, wherein the computer-executable instructions further cause the computing system to at least identify the first and second listings, and wherein to identify the first and second listings the computer-executable instructions cause the computing system to determine that at least one attribute within the first set of attributes matches at least one attribute within the second set of attributes.

20. The non-transitory computer-readable storage media of claim 14, wherein to determine that the image count value satisfies the image count threshold and that the attribute count value satisfies the attribute count threshold the computer-executable instructions cause the computing system to determine a correlation value based at least partly on one or more of the image count value or the attribute count value and determine that the correlation value satisfies a correlation value threshold.

* * * * *